(12) United States Patent
Cook, II

(10) Patent No.: US 7,782,002 B2
(45) Date of Patent: Aug. 24, 2010

(54) POWER CONVERTER

(75) Inventor: James C. Cook, II, Marshall, MI (US)

(73) Assignee: Progressive Dynamics, Inc., Marshall, MI (US)

( * ) Notice: Subject to any disclaimer, the term of this patent is extended or adjusted under 35 U.S.C. 154(b) by 432 days.

(21) Appl. No.: 11/221,962

(22) Filed: Sep. 8, 2005

(65) Prior Publication Data

US 2006/0083031 A1    Apr. 20, 2006

Related U.S. Application Data

(60) Provisional application No. 60/607,950, filed on Sep. 8, 2004.

(51) Int. Cl.
  *H02H 7/10* (2006.01)
(52) U.S. Cl. ................ 318/471; 318/461; 388/800; 388/934
(58) Field of Classification Search ............ 318/471, 318/461; 388/800, 934
  See application file for complete search history.

(56) References Cited

U.S. PATENT DOCUMENTS

| | | | |
|---|---|---|---|
| 3,571,660 A | 3/1971 | Phillips | |
| 3,577,035 A | 5/1971 | Constable | |
| 3,678,368 A | 7/1972 | Popp | |
| 3,697,861 A | 10/1972 | Frazier | |
| 3,769,573 A | 10/1973 | Scantlin | |
| 3,781,633 A | 12/1973 | Iwaki et al. | |
| 3,855,516 A | 12/1974 | Fairchild | |
| 3,959,716 A | 5/1976 | Gilbert, Jr. et al. | |
| 4,061,956 A | 12/1977 | Brown et al. | |
| 4,073,003 A | 2/1978 | Chambers | |
| 4,151,387 A | 4/1979 | Peters, Jr. | |
| 4,385,269 A | 5/1983 | Aspinwall et al. | |
| 4,413,211 A * | 11/1983 | Fowler | 318/257 |
| 4,415,945 A | 11/1983 | Periot | |
| 4,499,385 A | 2/1985 | Slavik | |
| 4,507,938 A * | 4/1985 | Hama et al. | 62/324.1 |
| 4,564,800 A | 1/1986 | Jurjans | |
| 4,564,896 A | 1/1986 | Akerson | |
| 4,589,475 A * | 5/1986 | Jones | 165/293 |
| 4,617,472 A | 10/1986 | Slavik | |
| 4,709,315 A | 11/1987 | Ramos | |
| 4,717,994 A | 1/1988 | Diaz et al. | |
| 4,742,441 A | 5/1988 | Akerson | |
| 4,871,957 A | 10/1989 | Taranto et al. | |
| 4,891,764 A | 1/1990 | McIntosh | |
| 4,959,606 A | 9/1990 | Forge | |

(Continued)

*Primary Examiner*—Bao Q Vu
(74) *Attorney, Agent, or Firm*—Young Basile Hanlon & MacFarlane, P.C.

(57) ABSTRACT

A switch-type power converter comprising an PET switch operating in a variable duty cycle mode under the control of a Unitrode 3846 integrated circuit controller. Indications of excess input voltage and reverse battery connections are provided by circuits including an element which permanently changes state. A cooling fan mounted on a finned heat sink is operated in a variable speed mode. A single thermistor sensor provides inputs to both the fan speed control and a thermal shutdown circuit connected to shut down the gate drives to the FET switch in the event of a high temperature condition. Another shutdown function is provided in response to an input overvoltage condition by way of an operational amplifier. The converter uses foldback for short circuit protection and is compatible with microprocessor units to selectively provide multiple output voltage levels.

16 Claims, 20 Drawing Sheets

U.S. PATENT DOCUMENTS

| | | | |
|---|---|---|---|
| 5,019,717 A | 5/1991 | McCurry et al. | |
| 5,034,871 A | 7/1991 | Okamoto et al. | |
| 5,077,652 A | 12/1991 | Faley | |
| 5,155,672 A | 10/1992 | Brown | |
| 5,168,436 A | 12/1992 | Barlage | |
| 5,184,025 A | 2/1993 | McCurry et al. | |
| 5,192,905 A | 3/1993 | Karlin et al. | |
| 5,202,811 A | 4/1993 | Minks | |
| 5,209,069 A * | 5/1993 | Newnan | 62/3.64 |
| 5,254,932 A | 10/1993 | Bittar et al. | |
| 5,285,367 A | 2/1994 | Keller | |
| 5,293,145 A | 3/1994 | Rynkiewicz | |
| 5,297,014 A | 3/1994 | Saito et al. | |
| 5,349,668 A | 9/1994 | Gladstein et al. | |
| 5,428,267 A | 6/1995 | Peil | |
| 5,583,416 A | 12/1996 | Klang | |
| 5,600,550 A | 2/1997 | Cook, II | |
| 5,616,270 A * | 4/1997 | Park | 219/722 |
| 5,623,197 A | 4/1997 | Roseman et al. | |
| 5,670,861 A | 9/1997 | Nor | |
| 5,680,031 A | 10/1997 | Pavlovic et al. | |
| 5,687,066 A | 11/1997 | Cook, II | |
| 5,736,831 A | 4/1998 | Harrington | |
| 6,396,231 B1 * | 5/2002 | Horng et al. | 318/471 |
| 6,407,525 B1 * | 6/2002 | Horng et al. | 318/473 |
| 6,551,065 B2 * | 4/2003 | Lee | 417/32 |
| 6,779,981 B2 * | 8/2004 | Huang et al. | 417/42 |
| 2002/0187049 A1 * | 12/2002 | Lee | 417/32 |
| 2003/0091441 A1 * | 5/2003 | Huang et al. | 417/42 |

* cited by examiner

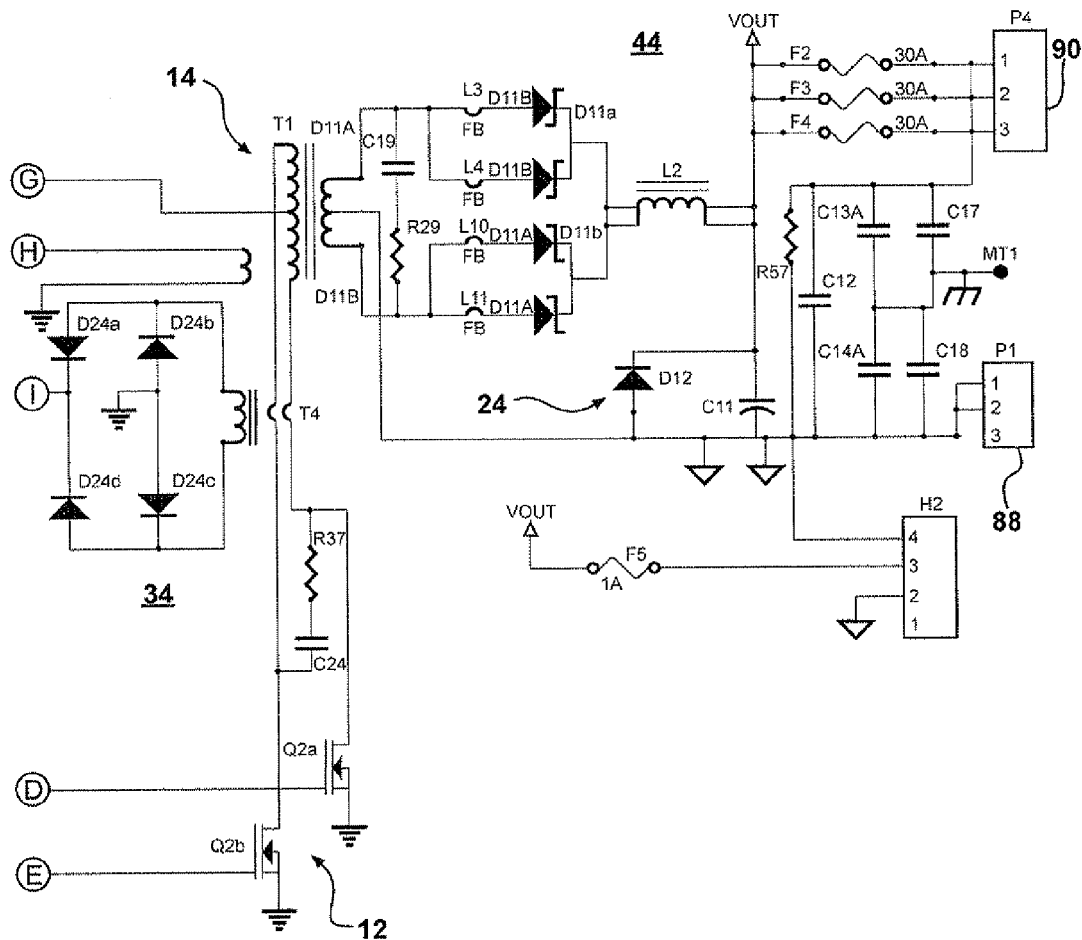
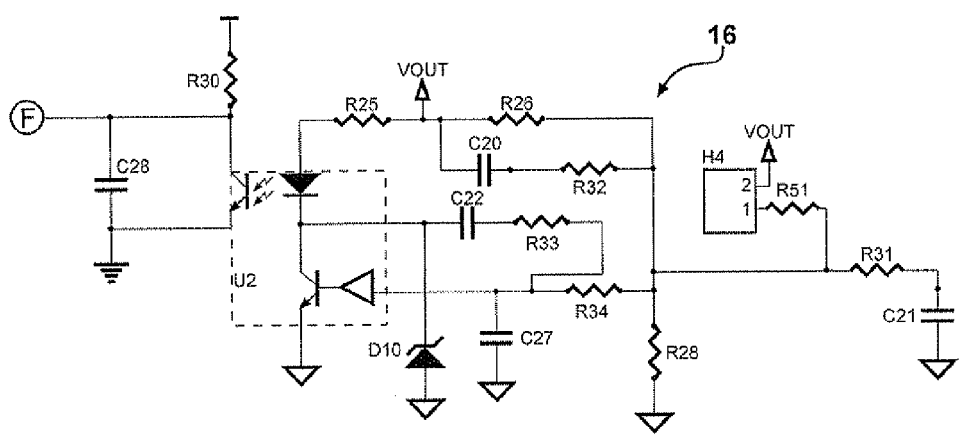
FIG - 2C

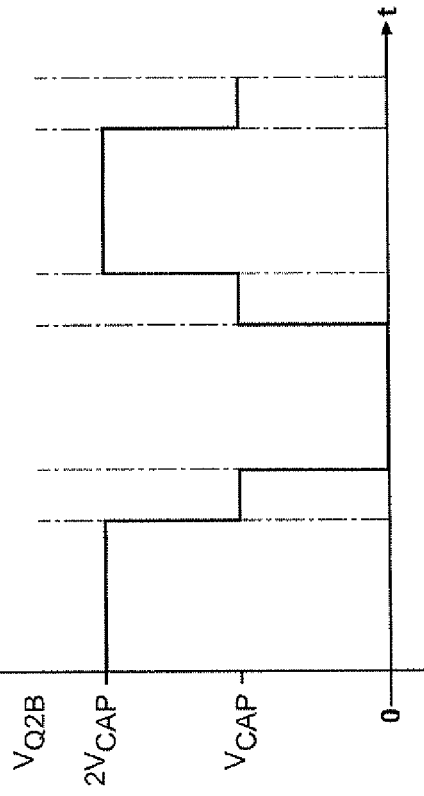
FIG - 5A
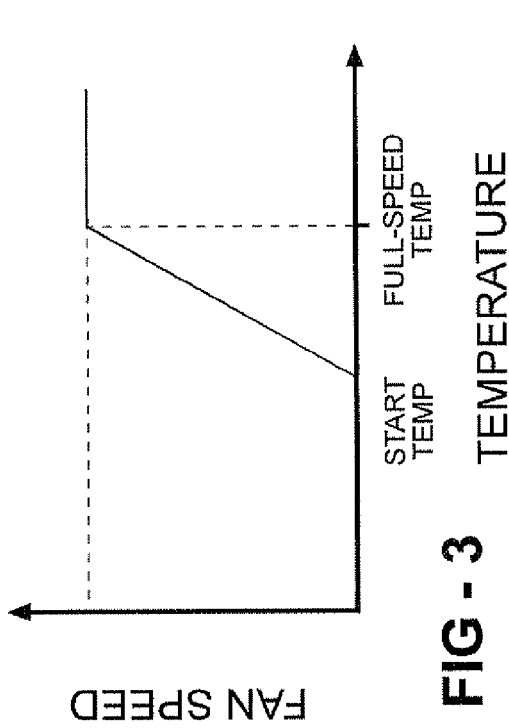
FIG - 3
FIG - 4

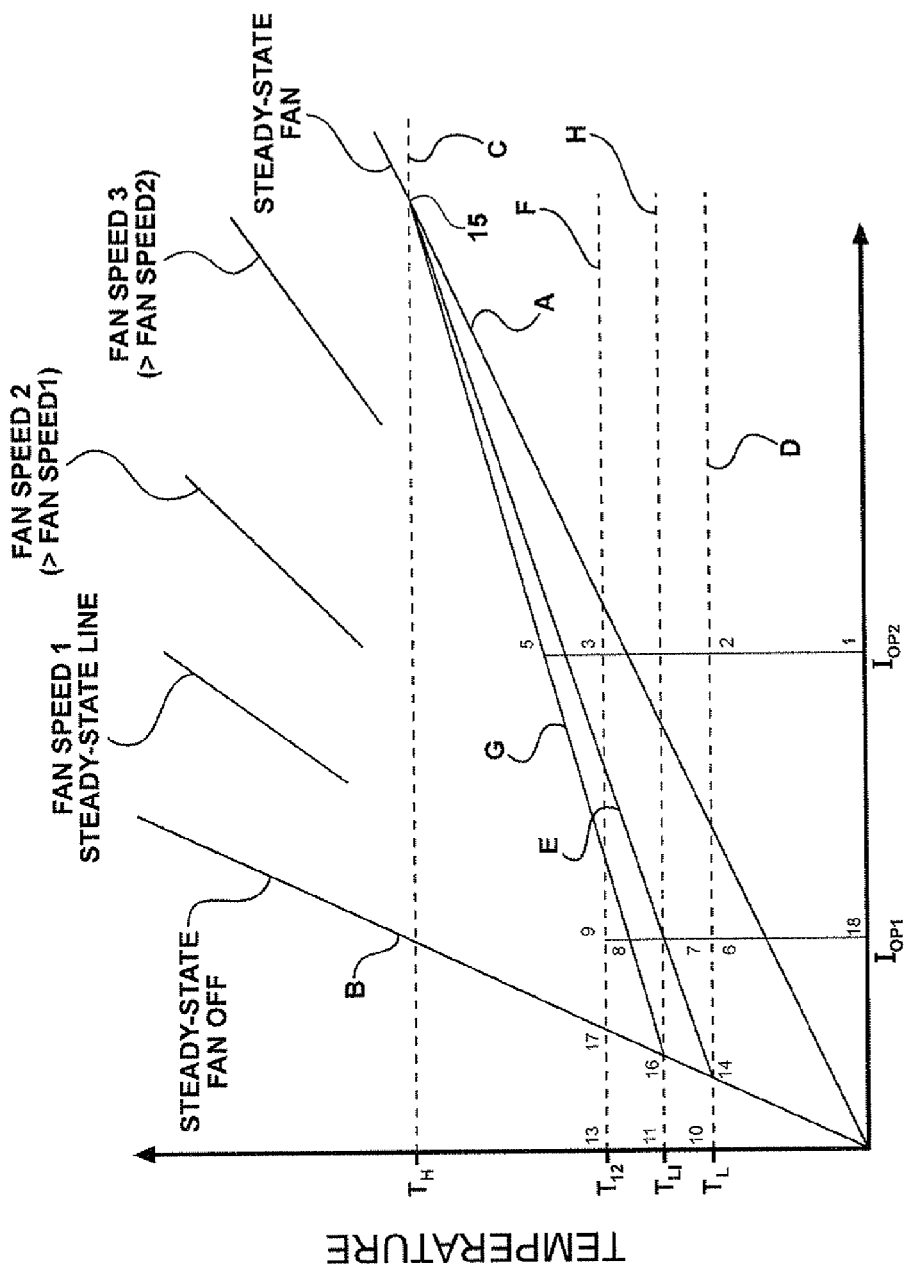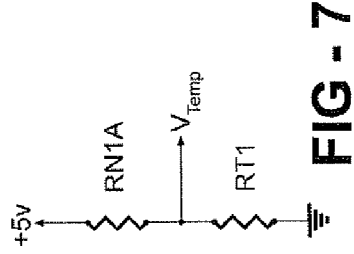

FIG - 19
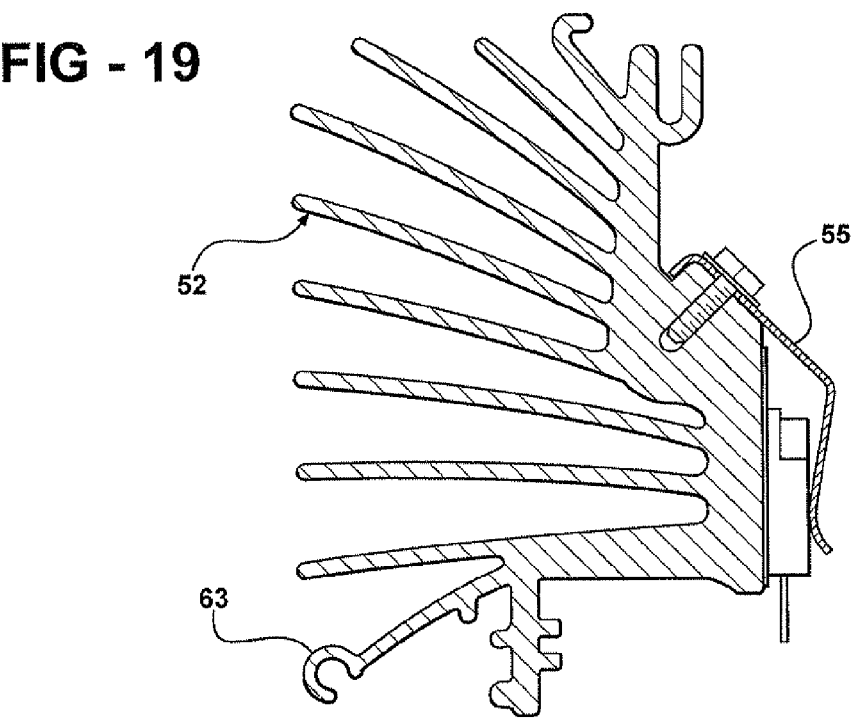
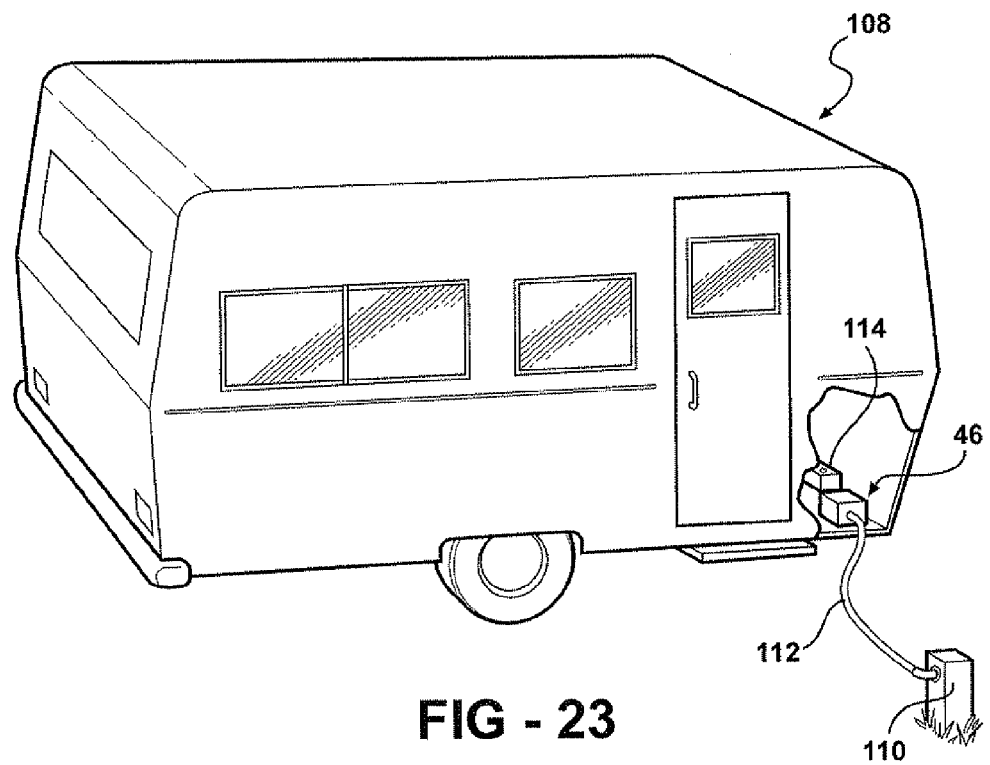
FIG - 23

US 7,782,002 B2

POWER CONVERTER

RELATED APPLICATION

This application claims priority in part to provisional application Ser. No. 60/607,950 filed on Sep. 9, 2004.

FIELD OF THE INVENTION

This invention relates to power converters, and more particularly to switch-type power converters designed for use in recreational vehicles as a regulated power supply for DC load devices and as a battery charger.

BACKGROUND OF THE INVENTION

As used herein, the terms "recreational vehicle" and "RV" should be construed to embrace motor homes, trailers, campers, van conversions, fifth wheels, boats, and similar products. The common characteristic of these recreational vehicles is an electrical system incorporating one or more batteries to provide power for DC load devices such as lights, refrigerators and motors. The more sophisticated recreational vehicles may also have alternating current systems and AC load devices such as stoves, televisions, microwaves and heating and ventilating systems. The AC load devices are typically powered from a 115 volt AC line voltage source brought to the recreational vehicle through a power cord and plug. Some recreational vehicles also carry generators powered by gas or diesel engines and capable of producing as much as 20 or more kilowatts of AC power.

It has become common to install power converters in recreational vehicles. A typical power converter converts 115 vac to 13.6 vdc and charges the RV battery or batteries as necessary. It has become more and more common to use "switch type" power converters rather than linear converters. There are numerous reasons for this including a substantial weight savings. Switch type power converters, often simply called "switchers" or "switching" power converters, typically use one or two power switching semi-conductor devices such as field effect transistors ("FET's") and a controller such as the Unitrode UC 3846 for operating the semi-conductor devices in a variable duty cycle mode. Such devices further typically include a step-down transformer and a smoothing circuit between the transformer and the regulated output voltage terminal.

A designer of such converters faces numerous issues including heat dissipation, noise generation, tolerance to unstable or excessive supply voltages and protection of the expensive circuit components found therein. The manufacturer of such devices faces these and other issues including warranty claims based on alleged defects when, in fact, field failures are often caused by improper use such as (1) accidentally connecting the converter input to an excessive voltage source such as a 220 vac line or an improperly regulated or runaway generator; and (2) accidentally connecting the RV battery in reverse polarity Power converters which deal with some of these issues are described in U.S. Pat. Nos. 5,600,550 and 5,687,066 issued to James Cook in February and November, respectively, of 1997 and assigned to Progressive Dynamics, Inc. of Marshall, Mich. The power converter described in the '550 patent is of the switch type in which the switch includes two FET's operating in a push/pull fashion under the control of an integrated circuit controller such as the Unitrode UC 3846. The converter further comprises a fan powered by the converter output and a pair of thermistors mounted on a large heat sink along with the FET's. One of the thermistors is used in combination with a set-point device to turn the fan on and off and the other is used to shut the controller down in the event temperature reaches an extreme or intolerable level.

U.S. Pat. No. 5,687,066 describes a converter identical to that of the '550 patent but adds overvoltage protection. This feature is provided by a Zener diode to sense an overvoltage condition in the dc output of a diode rectifier bridge used to convert an ac line voltage to dc. If the rectified supply voltage exceeds a predetermined limit, the Zener diode conducts and quickly sends a signal to a shut down pin of the Unitrode controller to prevent the controller from turning the FET's on. This protects the FET's from damage until the overvoltage condition subsides.

SUMMARY OF THE INVENTION

The subject invention has for its foundation a switch-type power converter/battery charger including a switch consisting of one or more FET's operating in a variable duty cycle mode. An integrated circuit controller such as the Unitrode UC 3846 is used with appropriate feedback and a rectifier and LC filter in the output stage to operate the switch to produce a regulated dc output.

The subject converter in a typical commercial embodiment includes a rectifier bridge so that the unit may be connected to a standard 60 cycle normal 115 volt ac line. This is typical of the line voltage made available by electric utility companies and/or commercial generators. The feedback system is used to cause the overall converter to operate in a current demand mode wherein the duty cycle of the switch is adjusted to maintain the desired output voltage.

In the preferred embodiment described herein, the converter further comprises a transformer for stepping voltages within the converter circuit down to a level suitable for use in connection with dc load devices and the charging of conventional storage batteries. Most of the reference voltages in the converter are taken from the primary side of the transformer. In addition, the fan supply and fan control are on the primary side of the transformer. By supplying the fan from the primary side, an undesirable drop in fan speed under heavy load conditions is avoided.

According to a first, more specific aspect of the present invention, a circuit is provided at or near the dc input of the converter; i.e., at or near the output of the ac-to-dc rectifier circuit, for providing a permanent indication of an abnormal over-voltage condition sufficient to cause circuit damage and likely to be the result of operator error. In general, the permanent over-voltage indicator comprises a circuit connected between the output of the ac-to-dc rectifier and ground and includes a device, such as a Zener diode, for establishing a very high breakdown voltage, and a device, such as a fuse, which permanently changes state in response to an over-current condition. The fuse and Zener diode are preferably chosen in the commercial embodiment to correspond to the conditions which might exist if the converter were accidentally connected to a 220 volt ac supply or to an unregulated or runaway generator. The permanent change of state in itself has no effect on converter operation, since it is not a shut down mechanism similar to that of the over-voltage protection feature. But it does provide the manufacturer or warrantor of the system with evidence that any damage occurring to the converter and/or its various circuit components was the result of an extreme over-voltage condition rather than system malfunction or component defects.

The permanent input over-voltage indicator is preferably used in combination with an over-voltage shutdown circuit also connected to the output of the ac-to-dc rectifier. The location and overall purpose of the over-voltage shutdown circuit is generally as described in the '066 patent where it is referred to as an overvoltage "protection" circuit, but preferably uses an operational amplifier to establish the shutdown set point voltage in a way which is more precise than that available from the use of a Zener diode as described in the '066 patent. The output of the over-voltage shutdown circuit is connected to a shut down pin in the variable duty cycle controller so as to prevent the switch transistors from turning on (and off again) while the over-voltage condition persists. This protects the expensive FET's and other components in the switch from damage. The set point of the over-voltage shutdown circuit in the illustrated embodiment is lower than that associated with the permanent over-voltage indicator device described above and the two circuits work in a cooperative fashion; i.e., the over-voltage shutdown circuit effects a shut down function at a first over voltage level whereas the permanent over-voltage indicator circuit changes state at a substantially higher over-voltage level likely resulting from, for example, owner/user error or generator runaway. However, the trip point of the overvoltage indicator could be set below or equal to the overvoltage shutdown circuit if the circuit designer wishes to do so.

Another aspect of the present invention in the foundation environment described above is a permanent reverse battery connection indicator circuit. This circuit detects a so-called "reverse" battery condition which results from the erroneous reverse polarity connection of the storage battery to the recreational vehicle electrical system after a period of disconnection for storage or service. Like the over-voltage indicator, the permanent reverse battery connection circuit includes a component which undergoes a permanent change of state when the battery is accidentally connected with the positive and negative terminals in reverse positions. Again, the permanent indicator does nothing to shut down or disable system operation, but simply provides an unequivocal indicator of owner/user error in the event a warranty claim is later made.

The converter of the present invention, like the converter described in the '066 patent, uses a metal heat sink as part of the converter packaging structure and mounts certain components on or in contact with the heat sink. A thermistor sensor, preferably mounted on or in contact with the heat sink, is used to monitor converter temperature and provide an output signal which, also unlike the '066 patent converter, is simultaneously supplied to two control circuits. The first control circuit operates the fan in a variable speed mode. These modes of operation are believed to not only extend fan life, but also reduce an annoying quality of fan noise. The thermistor sensor also furnishes a temperature-related signal to a second circuit including a comparator or "op-amp" to shut down the variable duty cycle controller in the event of a high temperature condition which may exceed the capacity of the fan.

Other aspects of the invention in the area of thermal control include a special mounting arrangement between the fan motor and the extrusion which provides the heat sink; i.e., a recess is machined into an end of the heat sink extrusion to provide an air gap between the extrusion and the fan motor so that the fan motor does not directly pick up heat from the extrusion. In addition, heavy wire leads are used in overlying relationship to the copper plating of a circuit board used to mount the elements of the circuit of FIG. 2. The wire leads are soldered to the board in high current connector areas. Numerous advantages flow from these packaging modifications as will be hereinafter explained in greater detail.

Still further aspects and advantages of the invention are described herein and will be best understood from a reading of the following specification which describes and illustrative embodiment in the form of an 80 amp power converter for use in recreational vehicles of the type using conventional storage batteries.

BRIEF DESCRIPTION OF THE DRAWINGS

FIG. 3 is a graph of temperature versus fan speed illustrating the operating curve of the fan according to the present invention;

FIG. 4 is a graph of fan voltage versus fan speed for a typical fan;

FIG. 6 is a graph of output converter current versus temperature for a variety of fan speeds;

FIG. 7 is a partial schematic diagram illustrating a temperature-responsive input circuit according to the present invention;

FIG. 19 is a cross-section of an illustrative heat sink showing a spring clip to hold a diode in the switch circuit against the heat sink;

FIG. 23 is a perspective view of a RV partially broken away to show the switched power converter according to the invention positioned therein;

DETAILED DESCRIPTION OF THE PREFERRED EMBODIMENTS

Figure 1:
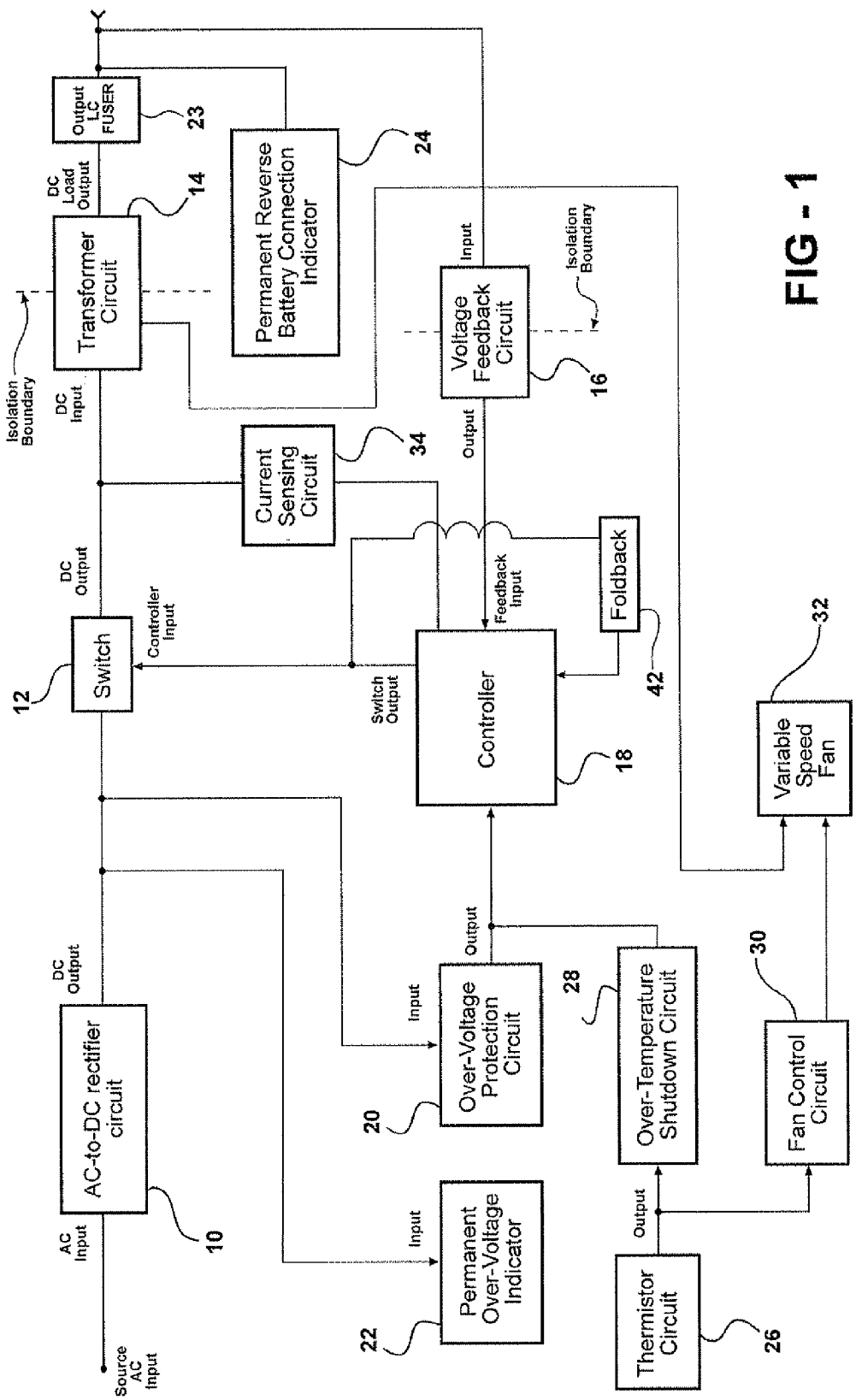
FIG. 1 is a block diagram of a switched power converter circuit according to the present invention.

FIG. 1 is a block diagram of a circuit for a switched power converter embodying the features of the present invention. The block diagram includes an AC-to-DC rectifier circuit 10, a switch circuit 12, a transformer circuit 14, a feedback circuit 16, a controller 18, an over-voltage shutdown circuit 20, a permanent over-voltage indicator 22, a permanent reverse battery indicator 24, a thermistor circuit 26, a variable speed fan 32, fan control circuit 30, an over-temperature shutdown circuit 28, a current sensing feedback circuit 34, a foldback circuit 42, and an output rectifier and LC filter circuit 44 including the inductor L2 referred to hereinafter.

The AC-to-DC rectifier circuit 10 converts a 115 v AC line voltage into an unregulated and time-varying dc signal with an average in the 170 volt range. It should be noted that the converter 46 can be plugged into a 170 vdc source, if available. In this case the rectifier 10 performs no rectification functions. The unregulated DC signal then enters the switching circuit 12 where the on/off states and duty cycle of the switching circuit 12 is determined by the controller 18 and feedback circuits 34 and 16. The switching circuit 12 includes two field effect transistors (FET's). The output of the switching circuit 12 is a regulated waveform containing unidirectional pulses.

Current sensing feedback circuit 34 is connected to the output of the switching circuit 12 for the purpose of measuring the output current. The output of the current sensing circuit 34 is connected to controller 18. Controller 18 adjusts the duty cycle of the FET's in the switching circuit 12 according to the current measured by the current sensing circuit 34 and the voltage measured by circuit 16. Accordingly, duty cycle is controlled by two factors: voltage feedback via circuit 16 and current feedback via circuit 34.

Over-voltage shut-down circuit 20 is connected between the output of the AC-to-DC rectifier circuit 10 and a shut-down pin of the controller 18 for the purpose of shutting off the switching circuit 12 in the event the rectified input voltage at 40 exceeds a pre-determined threshold voltage such as 195 vdc. The permanent over-voltage indicator 22 is connected to the output of the AC-to-DC rectifier circuit 10 for the purpose of triggering a permanent indicator in the event the voltage at 40 exceeds a second, higher threshold voltage, such as 220 vdc. As noted above, the second threshold voltage will typically be higher than the first, but could be lower or equal to the first threshold voltage. The over-voltage shut-down circuit 20 will protect the costly transistor components of the switching circuit 12 from being destroyed by the excessive input voltage conditions. The permanent over-voltage indicator 22 will provide evidence to the manufacturer that an undesirably high AC input voltage had been connected to the converter, e.g., a 220 VAC line voltage. The threshold voltage triggering the over-voltage shut-down circuit 20 is typically lower than the threshold voltage triggering the permanent over-voltage indicator 22, but can be higher or equal to the overvoltage indicator circuit trigger voltage.

The regulated signal passes from the switching circuit 12 to the transformer circuit 14. The transformer circuit 14 steps down the average of the unidirectional pulses to the level necessary for recreational vehicle use; e.g., ultimately to about 13.6 volts. The stepped down waveform is rectified and smoothed by circuit 44 before application to load devices. Feedback circuit 16 measures the voltage across the load. The output of the feedback circuit 16 is connected to controller 18. Controller 18 then controls the on/off state and duty cycle of the switching circuit 12 based in part on the input received from the feedback circuit 16.

A permanent reverse battery indicator 24 is also connected across the DC load for the purpose of providing a physical record that the operator connected a battery in reverse polarity. Such reverse battery connections may cause damage to the switched power converter, and the manufacturer may have an interest in knowing whether the damage was caused by the reverse connection of the RV battery as opposed to a manufacturing defect.

Thermistor circuit 26 senses the temperature of a heat sink 52 in the housing 70, and provides a variable resistance based on temperature. Over-temperature shutdown circuit 28 receives a signal from the thermistor circuit 26 and, if a set-point is exceeded, sends a shutdown signal to the controller 18. Controller 18 then terminates the operation of switching circuit 12. The over-temperature shutdown circuit 28 will not permit the operation of the switching circuit 12 until the temperature sensed by the thermistor has fallen below the undesirable temperature limit. Hysteresis in the circuit makes the temperature at which operation is resumed lower than the shutdown temperature.

Fan control circuit 30 receives a signal from thermistor circuit 26. The fan control circuit 30 produces a variable output based on the input from the thermistor 26. A variable speed fan 32 is connected to the variable output signal of the fan control circuit 30, such that the fan 32 will vary in speed based on the input signal. Accordingly, the speed of the fan 32 increases in response to increases in sensed temperatures. A low fan speed minimizes the annoying effects of fan noise at low to moderate power levels. The power supply for the fan 32 comes from the primary side of transformer circuit 14. This feature eliminates the tendency of the fan supply voltage to droop, with a corresponding fan speed reduction, under heavy load conditions.

Having briefly described the overall block diagram of the switched power converter circuit, the schematic circuit of an illustrative, mechanical embodiment will be described in detail with reference to FIGS. 2, 5 and 17. The preferred values of all described electrical components are listed at the end of the detailed description.

Input Circuit

Input circuit 36 is connected to a conventional AC power supply through a cable having a conventional 3-prong connector. The 3-prong connector includes a ground conductor, a positive conductor, and a neutral conductor. The cable runs into the housing through an aperture 100. The AC positive terminal is connected to AC positive input W1. The AC ground terminal is connected to AC ground W2 identified by a "chassis ground" symbol. The AC neutral terminal is connected to AC neutral input W3. AC positive input W1 is connected to thermistor RT2. Thermistor RT2 is used as an inrush current protector for the purpose of protecting fully discharged capacitors from receiving a surge of current. Thermistor RT2 initially (i.e. when cold) provides a high resistance but rapidly changes to a substantially lower resistance as the temperature increases, allowing an unrestricted AC signal to pass into the noise suppression circuit 38. It should be noted that there is a primary ground, secondary ground and a "chassis" ground and that different symbols are used for these in FIG. 2.

Noise Suppression Circuit

The noise suppression circuit 38 includes capacitors C15, C16, C26, C1, C2, C3, C30, C29, and C31, inductor beads L5, L6, L7, and L8, jumpers J6, J7, J8, J9, J10, and J11, and common mode choke (CMC) transformers T3, and T2. These electrical components provide electromagnetic interference noise suppression, and filtering to prevent noise from within the converter from traveling back into the ac supply line. Noise transfer suppression is also provided by capacitors C15, C16, and C26. One plate of C15 is connected to thermistor RT2, and one plate of C16 is connected to AC neutral input line W3. The other plates of capacitor C15, and C16 are connected to chassis ground, i.e., the ground of input W2. Capacitor C26 is connected in parallel to C15 and C16, where one plate of capacitor C26 is connected to thermistor RT2, and the other plate of capacitor C26 is connected to AC neutral input line W3. Both plates of capacitor C26 are connected through CMC transformer T3. Winding 2-1 of CMC transformer T3 is connected to thermistor RT2, and winding 3-4 of CMC transformer T3 is connected to AC neutral input line W3. The output of winding 2-1 is connected to the input side of fuse F1.

Additional noise suppression is provided by capacitors C1, C2, and C3. One plate of capacitor C1 is connected to the output side of fuse F1, and the remaining plate of capacitor C1 is connected to winding 3-4 of CMC transformer T3. Capacitor C1 is also connected to one plate of each of capacitors C2 and C3. The remaining plates of capacitors C2 and C3 are connected to chassis ground. CMC transformer T2 is connected in parallel to capacitors C2 and C3. Winding 2-1 of CMC transformer T2 is connected to the ungrounded plate of capacitor C2, and winding 3-4 of CMC transformer T2 is connected to the ungrounded plate of capacitor C3. Jumpers J6, J7, J8, are connected in parallel to winding 2-1 of CMC transformer T2, and jumpers J9, J10, and J11 are connected in parallel to winding 4-3 of CMC transformer T2. All jumpers provide the option of bypassing CMC transformer T2.

Additional noise suppression is provided by capacitors C30, C29, and C31. The windings of CMC transformer T2 are connected in parallel to capacitor C30. Capacitor C30 is also connected to one plate of each of capacitors C29 and C31. The remaining plates of capacitors C29 and C31 are connected to chassis ground. High frequency noise suppression is provided by inductor beads L5, L6, L7, and L8. L6 and L8 are fitted onto the bridge connection wires by causing the wires to pass through the center opening of each inductor bead core, wrap around the bead core, and then pass again through the bead core. The wires passing through L6 and L8 are then connected between T2 and a diode bridge DB1 forming the AC-to-DC rectifier 10. The inductor beads L5 and L7 are similarly mounted on the wires coming out of the diode bridge DB1 (see FIG. 2).

AC-to-DC Rectifier

The AC-to-DC rectifier 10 is composed of a diode bridge DB1, capacitors C4a, C4b, and C4c. The wires passing through L6 and L8 are connected to the input of diode bridge DB1. The wires passing through L5 and L7 are connected to the output of diode bridge DB1. Capacitors C4a, C4b, and C4c are connected in parallel between wires passing through inductor beads L5 and L7. The wire passing through L5 is connected to the positive plate of each capacitor C4a, C4b, and C4c, and the wire passing through L7 is connected to the negative plate of each capacitor C4a, C4b, and C4c. The negative plates of capacitors C4a, C4b, and C4c are also connected to ground. Under optimal conditions capacitors C4a, C4b, and C4c are charged by the output of diode bridge DB1 to a desired voltage of 170 volts. Capacitors C4a, C4b, and C4c provide an unregulated DC signal to unregulated DC terminal 40.

Permanent Over-Voltage Indicator

The permanent over-voltage indicator 22 includes fuse Fx1 and Zener diode D23 connected in series between the output 40 of rectifier bridge DB1 and ground. The permanent over-voltage indicator 22 receives the voltage developed across capacitors C4a, C4b, and C4c, and causes the fuse to change state if the voltage across the capacitors reaches an undesirably high level. The cathode of Zener diode D23 is connected to the output of fuse Fx1 and the anode of Zener diode D23 is connected to ground. It will be noted in FIG. 2 there are three different ground symbols. One is chassis ground, connected between C2 and C3 for instance. Another is primary circuit ground, connected to pin 12 of U1 for instance. And lastly there is a secondary circuit ground, connected to the output P1 terminal for instance. Each of these three ground symbols refer to separate voltage reference points and are isolated from each other. It will be further noted that the primary ground symbol is subdivided into an S, S2 and P ground. The explanation is:

S is the signal ground

S2 is the current sensing circuit ground

P is the power ground

In practice, these grounds are separate except at one point in circuit board layout to avoid parasitic noise cross talk. Nevertheless, physically they are the same since they are connected by copper traces and wires. The same is the case for the S and P shown with secondary ground symbol.

The purpose of the permanent over-voltage indicator 22 is to provide a permanent indication of receiving an undesirably high input voltage greater than that which triggers the over voltage shut down circuit 20. If the permanent over-voltage indicator 22 changes state, it will be because the converter input receives an excessive voltage, caused, for example, by a 220 vac supply or runaway generator. If enough voltage is applied to Zener diode D23 it will fail short creating a direct connection between fuse Fx1 and ground. This short failure of D23 causes Fx1 to permanently change state, i.e., blow out to create an open circuit. The preferred voltage limit of the permanent over-voltage indicator 22 is normally 220 volts dc. It will be noted that because the indicator circuit 22 is a shunt, failing the diode and blowing the fuse Fx1 does not disable the converter. The term "permanent" is used herein to mean device which does not reset by itself; i.e., it must be replaced to operate a second time. Since tripping the indicator does not shut down the converter, the owner has no reason to replace it and typically will not be aware of its presence. Therefore, it remains in the converter until the converter is returned for service or a warranty claim. For the majority of converters, this never happens. However, for the small percentage of converters returned for a warranty claim, the indicator helps the manufacturer evaluate the likelihood that circuit failures are the result of excessive input voltage other than manufacturing or material defect. If a converter is returned for service and the indicator fuse Fx1 is failed, it will be replaced along with any other failed components and may, for example, signal the need to provide the owner with a cautionary message regarding the quality of the supply voltage source being used.

Over-Temperature Shut-Down Circuit

The over-temperature shutdown circuit 28 measures the heat sink temperature in the switched power converter and triggers a shutdown of the switching circuit 12 upon receiving an undesirably high temperature. The over-temperature shutdown circuit 28 includes Schottky diode D3, resistors R8, RN1B, R7, and RN1A, operational amplifier U3A, and thermistor RT1. Thermistor RT1 changes in resistance based on sensed temperature. Preferably thermistor RT1 is a negative-temperature-coefficient device and is mounted on or in contact with the converter heat sink 52 in the manner shown in FIG. 19; i.e., a spring clip holds the sensor against a surface of the casting which makes up the sink 52. Because the FET's in the switch 12 are also mounted in contact with the sink 52, heavier load conditions cause the temperature of the sink 52 to rise. If turning the fan 32 on stabilizes the temperature, no further remedy is needed. It should be noted that the thermistor RT1 does not have to be mounted on the heat sink, but can be mounted to measure, for example, air temperature or the temperature of some component such as the transformer 14 or the output inductor in circuit 44. The illustrated arrangement is, however, preferred.

Operational amplifier U3A is used as a comparator for the purpose of triggering shutdown pin (pin 16) of controller 18 in the event that the internal temperature of the switched power converter exceeds a set-point temperature. Once shutdown pin (pin 16) of controller 18 is triggered the operation of switching circuit 12 is terminated.

Operational amplifier U3A includes the following connections: pin 1 is the output, pin 2 is the negative input, pin 3 is the positive input, pin 4 is connected to a 5 volt reference voltage 5REF, and pin 11 is connected to ground. Pin 2 is connected to a temperature based variable voltage coming from a voltage divider circuit comprised of resistor RN1A and thermistor RT1. Pin 3 is connected to a reference voltage through a voltage divider circuit using resistors R8, R7, and RN1B. Pin 1 is connected to resistor R8, and Schottky diode D3 leading to shutdown pin (pin 16) of controller 18.

The output of operational amplifier U3A will remain at a low (ideally zero) voltage and will not trigger shutdown pin 16 of controller 18 as long as pin 3 input does not exceed the pin 2 input. When the internal temperature is sufficiently high, the voltage on pin 3 will exceed the voltage on pin 2 and the output of pin 1 will go high and trigger a shutdown.

The over-temperature shutdown circuit 28 will operate as follows under a cold temperature condition (i.e. a temperature condition where a thermal shutdown is not required). Resistor RN1A and thermistor RT1 form a voltage divider circuit. Resistor RN1A is connected to a 5 volt reference 5REF and thermistor RT1 is connected to ground. Thus, pin 2 receives the voltage between resistor RN1A and thermistor RT1. Accordingly, the voltage applied to pin 2 will vary depending on the temperature of the heat sink 52.

The value of resistor RN1A is 16.2K ohms, and the value of thermistor RT1 is 100K ohms of 25° C. Thus, when the switched power converter is initially turned on and the temperature is cold the value of thermistor RT1 will be about 100K ohms. At cold startup the voltage applied to the pin 2 of operational amplifier is roughly 4.3 volts. Further, at a cold (i.e. non thermal shutdown) temperature pin 1 will be near 0 volts because the voltage at pin 2 is higher than the voltage at pin 3. When the voltage at pin 1 is near 0 volts, resistor R8 is parallel with resistor R7.

In the illustrative embodiment, the values of resistors R8, R7 and RN1B are 499K, 32.4K, and 47.5K ohms respectively. Because resistors R8 and R7 are in parallel, their equivalent resistance at 25° C. is 30.4K ohms. This resistance of 30.4K ohms will be called $R_{coldtemp}$. Accordingly, the voltage at pin 3 will be the measured voltage between resistor RN1B and $R_{coldtemp}$. Using a voltage divider, the voltage applied to pin 3 at a cold temperature is 1.925 volts. This voltage will be called $V_{coldtemp}$. Accordingly, at a cold temperature the voltage at pin 3 will be $V_{coldtemp}$ which is 1.925 volts. If the internal temperature significantly increases, the resistance of thermistor RT1 will decrease and the voltage applied to pin 2 will fall below the voltage applied to pin 3, the output of pin 1 will become positive, and the switched power converter will experience a thermal shutdown.

The over-temperature shutdown circuit 28 will operate as follows under a thermal shutdown condition (i.e. a temperature condition where a over-temperature shutdown is required). A shut down temperature is never reached if the load on the converter is within normal specifications because the fan 32 will provide sufficient cooling. If the load is very heavy and/or the operator has covered the converter 46 with blankets or the like, a shut down temperature may be reached. If this happens, the voltage applied to pin 1 will be approximately 5 volts. When pin 1 reaches 5 volts, resistors RN1B and R8 will be in parallel (as opposed to resistor R7 being in parallel with resistor R8 at a cold temperature). The equivalent resistance of resistors RN1B and R8 in parallel is 43.37K ohms. This resistance will be called $R_{hottemp}$. Accordingly, the voltage at pin 3 will be the measured voltage between resistor R7 and $R_{hottemp}$. Using a voltage divider the voltage applied to pin 3 at a cold temperature is 2.138 volts. This voltage will be called $V_{hottemp}$. Accordingly, in order for the switching circuit 12 to begin operation the voltage on pin 2 must rise above $V_{hottemp}$ (rather than $V_{coldtemp}$). This hysteresis caused by resistor R8 is important so that the switching circuit 12 will not be enabled until the internal temperature falls significantly below the temperature at which the thermal shutdown was triggered.

Over-Voltage Shutdown Circuit

The over-voltage shutdown circuit 20 measures the voltage of capacitors C4a, C4b, and C4c, and will shutdown the switching circuit 12 in the event of an over-voltage condition at point 40. The over-voltage circuit 20 includes resistors R38, R39, R40, R7, and RN1B, operational amplifier U3B, and Schottky diode D27. The output of over-voltage shut down circuit 20 is connected to shutdown pin 16 of controller 18, such that a high signal will terminate the operation of switch 12. The over-voltage shut-down circuit 20 assures that transistors Q2a and Q2b are not damaged in the event of an undesirably high voltage at the output of the ac-to-dc converter; i.e., at point 40. As discussed above, there are a number of factors which may cause high voltage conditions to exist. Lightning strikes or transients from other loads on the supply line, unregulated generators, runaway generators and the like may all cause over-voltage conditions.

Transistors Q2a and Q2b are rated at 500 volts. Because of the properties of transformer T1, transistor elements Q2a and Q2b will experience a voltage twice that imposed on capacitors C4a, C4b, and C4c. Accordingly, when capacitors C4a, C4b, and C4c are at 250 volts, the transistor elements Q2a and Q2b will experience 500 volts. Accordingly, if the voltage of capacitors C4a, C4b, and C4c exceeds 250 volts transistors Q2a and Q2b may be damaged.

Operational amplifier U3B includes the following connections: pin 7 is the output, pin 6 is the negative input, pin 5 is the positive input, pin 4 is connected to a 5 volt reference voltage 5REF, and pin 11 is connected to ground. Pin 5 is connected to a voltage divider circuit comprised of resistors R38, R39, and R40. The voltage applied to pin 5 will vary depending on the line voltage of capacitors C4a, C4b, and C4c. Pin 6 is connected to a reference voltage through a voltage divider circuit comprised of resistors R8, R7 and RN1B. Pin 7 is connected to resistor R40, and schottky diode D27 leading to shutdown pin 16 of controller 18. The output of operational amplifier U3B will remain as a low, ideally zero, voltage and will not trigger shutdown via pin 16 of controller 18 as long as pin 5 input does not exceed pin 6 input. When the line voltage of capacitors C4a, C4b, and C4c is sufficiently high, the voltage on pin 5 will exceed the voltage on pin 6 and the output of pin 7 will trigger a shutdown.

The over-voltage shut-down circuit 20 will operate as follows under a normal voltage condition (i.e. a voltage condition that does not require an over-voltage shutdown). Resistors RN1B and R7 form a voltage divider circuit, where resistor RN1B is connected to a 5 volt reference 5REF and resistor R7 is connected to ground. Accordingly, pin 6 receives the voltage between resistor RN1B and R7. Remember, that the voltage applied between resistors RN1B and R7 will vary depending upon the operation of the over-temperature circuit 28 (i.e. when the temperature is cold resistor R8 is in parallel with resistor R7, and when a thermal shutdown temperature is achieved resistor R8 is in parallel with resistor RB1B). Accordingly, the voltage applied to pin 6 will vary depending on whether or not a thermal shutdown temperature is present. However, once a thermal shutdown has been triggered by over-temperature shut-down circuit 28 the operation of the over-voltage circuit 20 is irrelevant. Thus, for this explanation it will be assumed that the temperature is below shutdown level and resistor R8 is in parallel with resistor R7.

In the illustrated embodiment, the values of resistors R8, R7 and RN1B are 499K, 32.4K, and 47.5K ohms respectively. Remembering that at a low temperature resistors R8 and R7 are in parallel, their equivalent resistance is 30.4K ohms. This resistance of 30.4K ohms will be called $R_{coldtemp}$. Accordingly, the voltage at pin 6 will be the measured voltage between resistor RN1B and $R_{coldtemp}$. Using a voltage divider the voltage applied to pin 6 at a cold temperature is 1.925 volts. This voltage will be called $V_{shutdownref}$.

In illustrative embodiment, the value of resistors R38, R39, and R40 is 84.5K, 866, and 97.6K ohms, respectively. Prior to an over-voltage shutdown, pin 7 will remain at a low, ideally zero, voltage, causing resistor R40 to be in parallel with resistor R39. The equivalent resistance of resistors R39 and R40 in parallel is 858.4 ohms. This resistance of 858.4 ohms will be called $R_{normalvoltage}$. Pin 5 receives the voltage between the voltage divider circuit created by resistors R38 and $R_{normalvoltage}$. Accordingly, the unregulated DC terminal 40 voltage must exceed 195 volts for the voltage at pin 5 to exceed $V_{shutdownref}$ (e.g. if unregulated DC terminal 40 carries a voltage of 195 volts, pin 5 will be at approximately 1.961 volts which sufficiently exceeds the 1.952 volts applied to pin 6). Thus, when the unregulated DC terminal 40 reaches a voltage of 195 volts the output of pin 7 will become positive causing controller 18 to shutdown the switching circuit 12. Because capacitor voltage is approximately 1.4 times AC line voltage, the illustrative embodiment of the over-voltage shutdown circuit 20 will shut down the DC output if the AC input voltage exceeds 140 volts (i.e. the voltage of capacitors C4a, C4b, C4c exceeds 195 volts). Remember that the preferred embodiment of the permanent over-voltage indicator 22 will be triggered at about 220 volts. Accordingly, the output of the switched power converter will be terminated by the over-voltage shut down circuit 20 at a lower over-voltage condition than that which changes the state of the fuse Fx1 in the permanent over-voltage indicator 22.

The over-voltage shutdown circuit 20 operates as follows under an over-voltage shutdown condition (i.e. the AC input voltage exceeds 140 volts). When a over-voltage shutdown condition is reached, the voltage applied to pin 7 is approximately 5 volts. When pin 7 reaches 5 volts, resistor R40 is no longer in parallel with resistor R39, but will be used for a hysteresis effect. For example, when pin 7 is positive (i.e. over-voltage condition) resistor R40 will provide feedback into pin 5, which will in turn increase the voltage at pin 5. Accordingly, once operational amplifier U3B triggers a shut down, the voltage at terminal 40 must be significantly lower than the 195 volts which triggered the initial shut down because resistor R40 has temporarily increased the voltage measured by pin 5. The purpose of the resistor R40 hysteresis is to prevent the controller 18 from operating the switching circuit 12 until the voltage at terminal 40 has significantly fell below 195 volts.

Fan Control Circuit

The fan control circuit 30 includes resistors RN1A, R4, RN1C, R2a, R1, and R20, thermistor RT1, operational amplifier U3D, transistor Q1, capacitor C5, and Schottky Diode D1a. FIGS. 2-16 are used to describe the operation of the fan control circuit 30 and the fan 32. In this embodiment, the fan 32 is powered by a dc motor which varies in speed as a function of voltage amplitude, i.e., it is the control circuit which produces the variable speed characteristic. The fan control circuit 30 commands the fan 32 to come on at an initial (lowest) temperature. The speed of the fan 32 increases with temperature and will maximize at some point prior to the switched power converter being at full load. The fan control circuit is also described in the aforementioned provisional application, attorney docket no. PDY-106-A, the content of which is incorporated herein by reference.

An operating curve of the fan 32 using the fan control circuit 30 is shown in FIG. 3. (The slope is not necessarily linear as discussed in more detail herein.) The fan control circuit 30 will cause the fan 32 to come on at low speed when temperatures are over the set point by only a small amount.

The relationship between the voltage applied to the fan and the fan speed is shown in FIG. 4. Due to static friction the fan 32 does not start moving until a certain voltage is reached. Specifically, and as illustrated in FIG. 4, the fan blades will not move until the voltage at point 2 is reached. Compared to the thermal time constants, it more or less instantaneously starts moving, jumping to point 3 (initial turn on point). As the voltage increases, it moves to point 4, where the fan 32 is operating at maximum speed. On the way down, the variable voltage controlled fan 32 follows from point 4 (maximum operation) to point 3 (initial turn on point) to point 1 (shut off).

FIG. 6 illustrates in principle how the fan control circuit 30 works. Temperatures $T_H$ and $T_L$ are the temperatures at which the fan 32 is ideally full on and full off, respectively. More accurately, $T_H$ (line C) is the temperature at which full fan voltage is applied, and $T_L$ (line D) is the temperature at which no voltage is applied to the fan 32. Currents below point 14 have steady-state operating points on the "fan off" line (line B). currents above point 15 have steady-state operating points on the "fan full on" line (line A). Therefore, points 14 and 15 must be the beginning and end of the line of operating points when operating at currents where the variable voltage controlled fan 32 is in an intermediate state between full on and full off. Although a straight line (line E) is shown connecting these two points, the relationship is not necessarily a linear one. It is clearly, however, a strictly increasing (positive slope) function. FIG. 6 illustrates the ideal case.

Assume the switched power converter starts cold at current operating point $I_{OP2}$, point 1. The switched power converter will warm up and at point 2, $T_L$, the fan 32 will start to turn slowly. The heat sink 52 continues to warm up until it reaches its steady-state operating point, point 4. Similarly, for current operating point $I_{OP1}$, the switched power converter will start at point 18, the fan 32 will come on at point 6 and settle into a steady speed at point 7.

Turning to FIG. 4, the operating characteristics of fan 32 are explained. Assume that $T_{L1}$ corresponds to point 1 on FIG. 4 and that $T_{L2}$ corresponds to point 2 on FIG. 4 (same as point 3). Thus, returning to FIG. 6, line G describes an actual fan 32. Again, this relationship is not necessarily a linear one as shown, but it is a positive slope function. Starting cold with operating current $I_{OP2}$, the temperature increases. At point 2 ($T_L$), voltage starts being applied to the variable voltage controlled fan 32, but it is not yet moving. At point 3 ($T_{L2}$) the fan 32 begins to rotate. The switched power converter continues to heat up and eventually settles at point 5 (along line G). For $I_{OP1}$, the switched power converter would start cold at point 18 and heat up to point 6 ($T_L$). At point 6, voltage begins to be applied to the fan 32. The switched power converter will continue to heat up until point 9 ($T_{L2}$), where the fan 32 begins moving. The fan 32 will now be moving faster than it needs to, the switched power converter will cool and eventually settle into a steady state speed at point 8 (along line G).

In both cases, the fan 32, once started, continues to rotate. There is no discontinuance of operation. Notice further that variable voltage controlled fan 32 speeds are slower (and less noisy) for all current levels up to point 15 ($T_H$). Also notice the minimum current to turn the fan 32 on corresponds to point 17 ($T_{L2}$), but if already on, it will stay on to a lower current, corresponding to point 16 ($T_{L1}$).

A description of the fan control circuit 30 is illustrated in FIGS. 2, and 7-16. The preferred embodiment of the fan control circuit includes resistors RN1A, R4, RN1C, R1, and R2a, thermistor RT1, transistor Q1, and operational amplifier U3D. Operational amplifier U3D includes the following connections: pin 14 is the output, pin 12 is the positive input, pin 13 is the negative input, pin 11 is connected to ground, and pin 4 is connected to a 5 volt reference voltage 5REF.

Figure 2A:
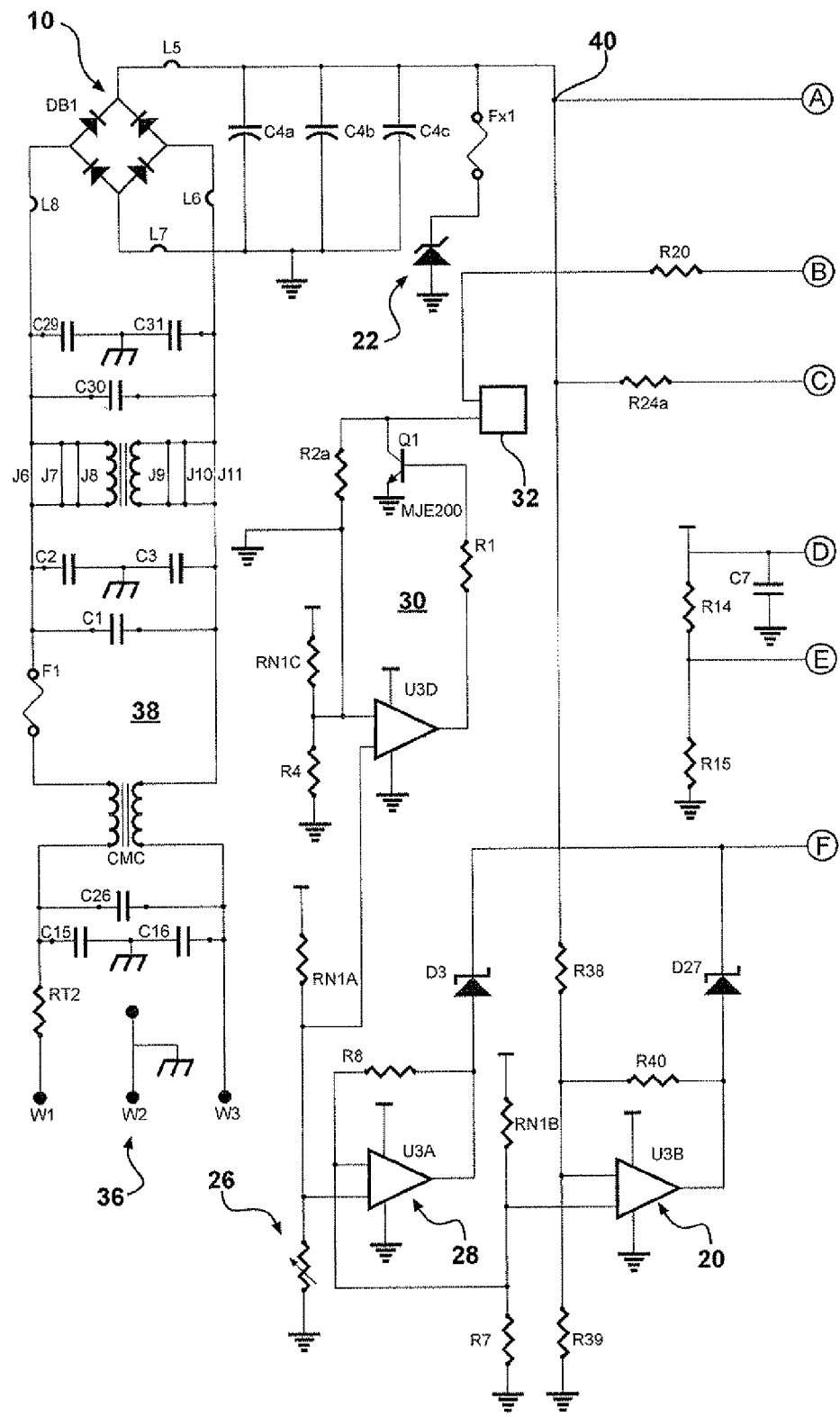
FIG. 2 is a schematic circuit diagram of an illustrative switched power converter circuit embodying the inventive features described above.
Figure 2B:
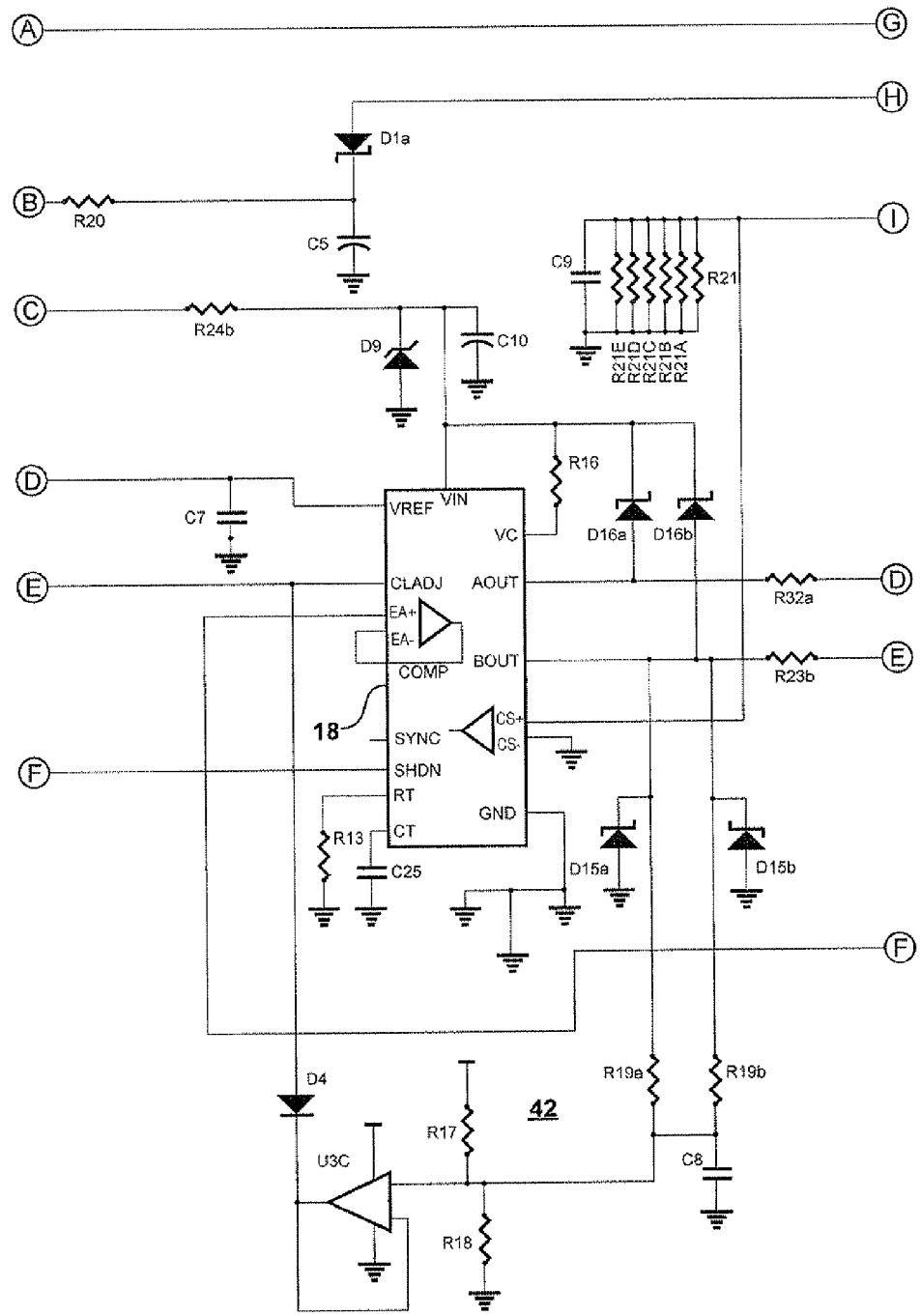
Figure 8:
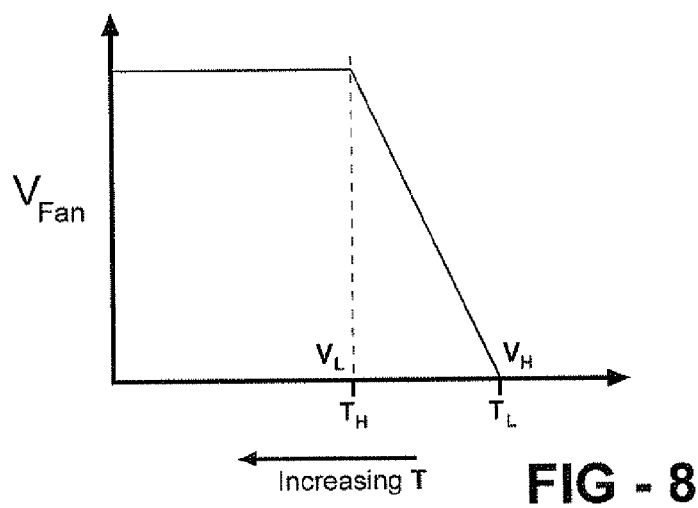
FIG. 8 is a graph of $V_{tempvar}$ of FIG. 7 versus fan voltage showing the desired characteristic.

As illustrated in FIGS. 2, and 7, thermistor RT1 is used as a temperature sensor for the fan control circuit 30 as well as the over-temperature shutdown circuit 28. Thermistor RT1 is connected to ground as well as resistor RN1A which also connected to a 5 volt reference 5REF. Thermistor RT1 and resistor RN1A are used to create a voltage divider circuit where $V_{tempvar}$ is the output of the voltage divider circuit. $V_{tempvar}$ is connected to pin 13 of operational amplifier U3D. Preferably RT1 is a negative-temperature-coefficient thermistor. As the internal temperature increases, $V_{tempvar}$ decreases. For the remainder of the fan control circuit 30, a profile of a desirable fan voltage versus $V_{tempvar}$ is shown in FIG. 8.

Figure 9:
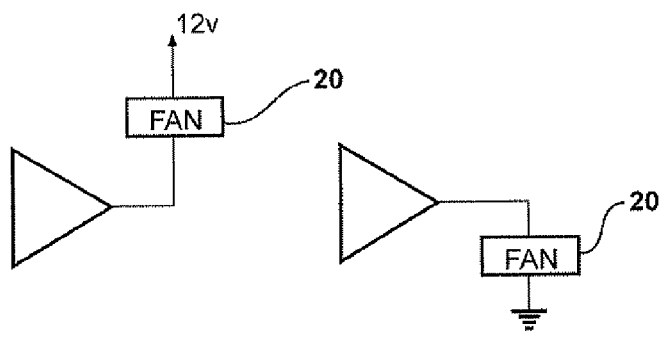
FIG. 9 shows partial schematics of a fan connected to an operational amplifier.
Figure 10:
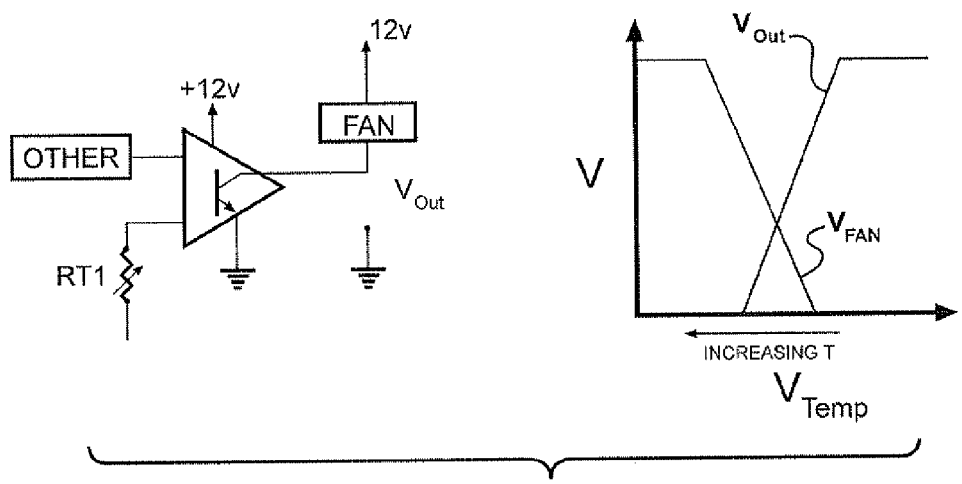
FIG. 10 shows a partial schematic of a fan connected to an open collector operational amplifier and a graph showing the resulting fan voltage curve with temperature changes.
Figure 11:
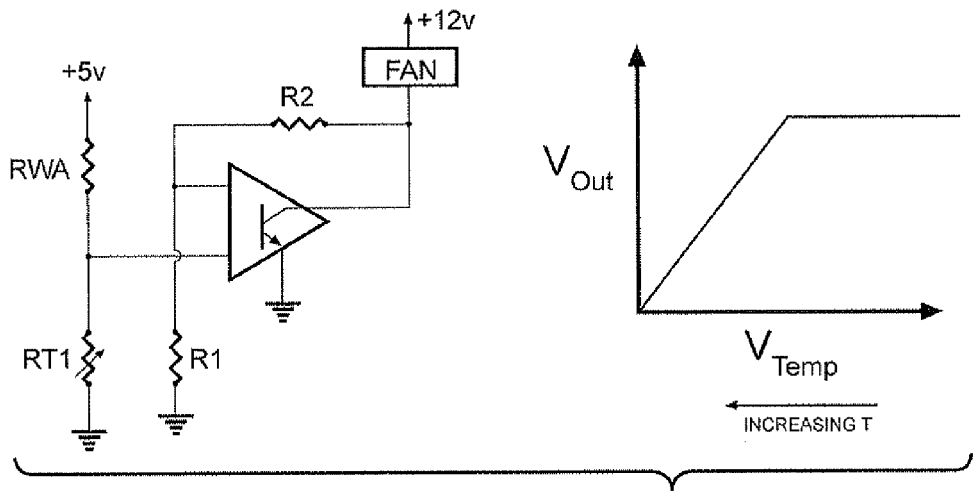
FIG. 11 shows the partial schematic of FIG. 10 with the addition of a gain amplifier and a graph showing the resulting fan voltage curve with temperature changes.
Figure 12:
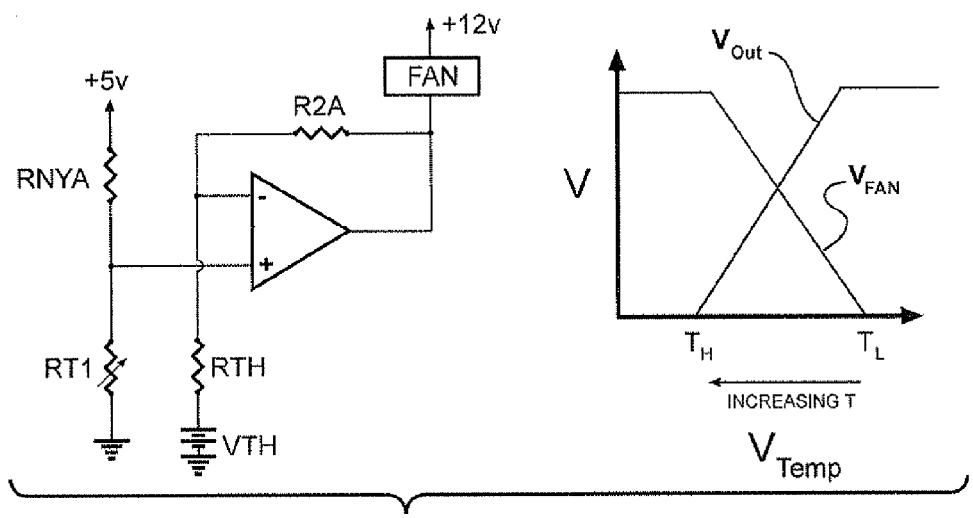
FIG. 12 shows the partial schematic of FIG. 11 with the addition of circuit to shift the zero point of the fan voltage curve and a graph showing the resulting fan voltage curve with temperature changes.

Because the components used in switched power converter (i.e. operational amplifier U3D) are powered by 5 volts, whereas the fan 32 requires a nominal 12 volts, a direct connection of an operational amplifier such as that shown in FIG. 9 will not work. Simply stated an operational amplifier such as operational amplifier U3D cannot supply sufficient current or voltage to the fan 32. Neither will transistor emitter follower-type circuits work because of voltage limitations. An open collector operational amplifier would work in a circuit such as that shown in FIG. 10, and a simple gain amplifier would almost provide the desired profile as shown in FIG. 11. Shifting the "zero" point will get the desired profile as shown in FIG. 12. Specifically, a Thevenin resistance and voltage coupled to the negative input of the operational amplifier would shift the zero point of the fan control.

Figure 13:
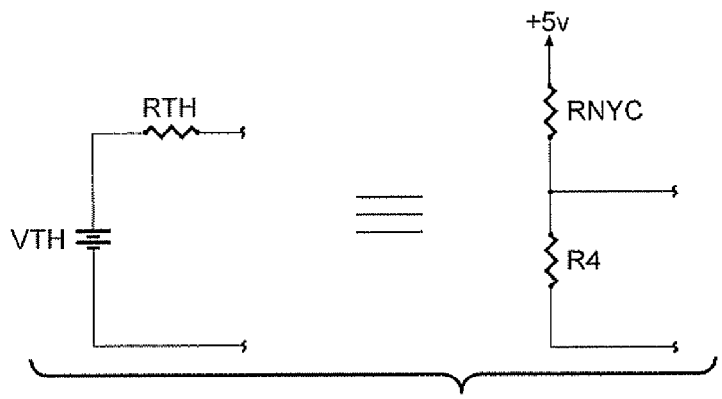
FIG. 13 shows the equivalent circuit to the circuit to shift the zero point of FIG. 12.
Figure 14:
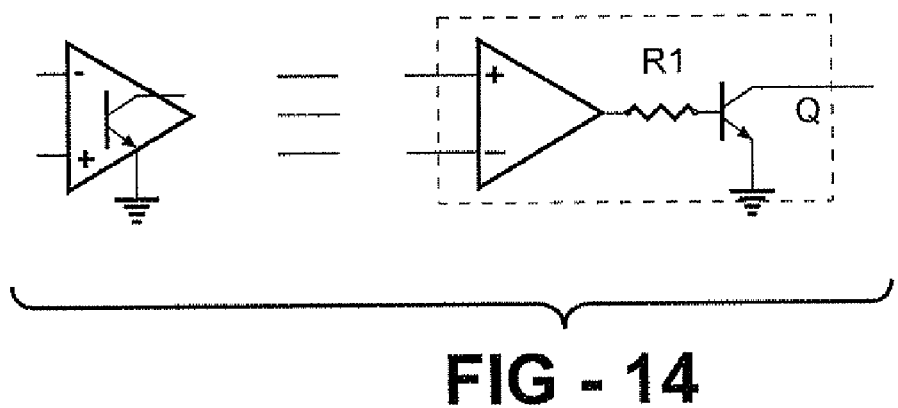
FIG. 14 shows the equivalent circuit to the open collector operational amplifier of FIG. 12.

FIG. 13 illustrates an equivalent of the Thevenin resistance and voltage, and the open collector operational amplifier is shown equivalently in FIG. 14. Using a conventional operational amplifier having an output connected to resistor R1 and transistor Q1 will result in a complete fan control circuit according to FIG. 15. In almost all cases, the fan 32 will be quiet, and only under extended high load or high ambient temperature condition will the switched power converter warm up enough to cause the fan 32 to be heard.

Figure 15:
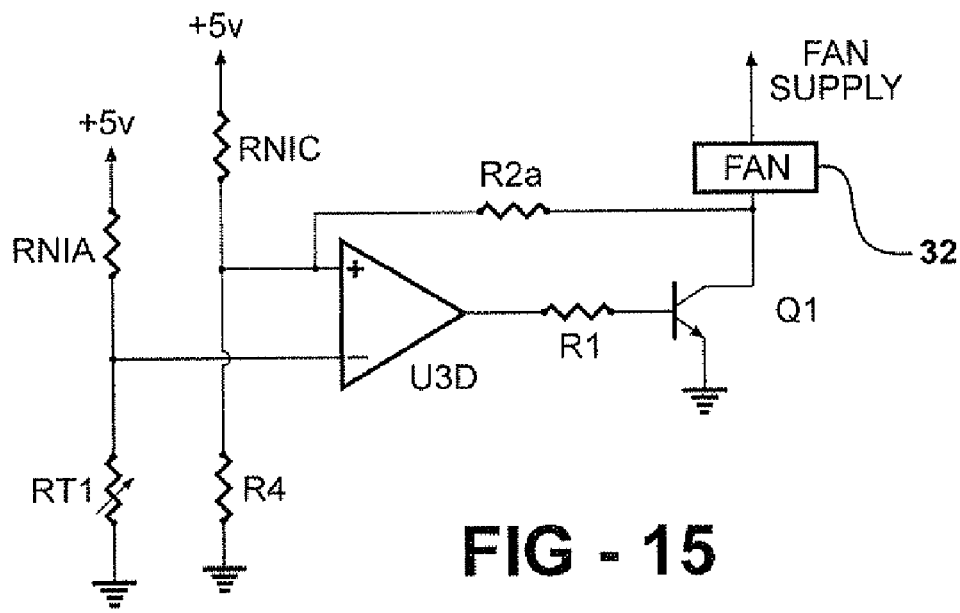
FIG. 15 is a schematic of a first embodiment of the control circuit according to the present invention.
Figure 16:
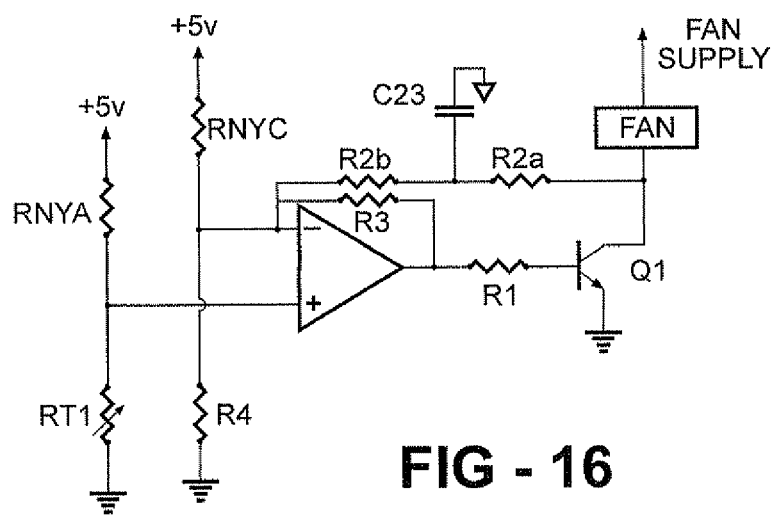
FIG. 16 is a schematic of a second, alternative, embodiment of the control circuit according to the present invention.

Because the circuit in FIG. 15 has a linear range between full on and full off, significant power will be dissipated in transistor Q1 at intermediate fan speeds. An alternative is to modify the linear circuit to act as a duty cycle control circuit as shown in FIG. 16. With duty cycle control, transistor Q1 will be either full on or full off (zero voltage or zero current), but the duty cycle will vary to control the speed of the fan.

In FIG. 16, resistor R3 adds hysteresis and causes operational amplifier U3D to behave as a comparator. As the switched power converter warms up, transistor Q1 is off until it reaches a "low" temperature. The fan control circuit 30 then breaks into oscillation with low "on" duty cycle on transistor Q1. As the switched power converter continues to warm, the duty cycle gets larger. When an upper temperature is reached, the oscillation stops, and transistor Q1 is always on and stays on as the temperature increases further.

The fan control circuit 32 as shown in FIG. 2 includes resistors RN1C and R4 acting as a voltage divider circuit connected to pin 12 of operational amplifier U3D. Resistor RN1C is connected to 5 volt reference 5REF and resistor R4 is connected to ground. The preferred value of resistor RN1C is 9.53K ohms, and the preferred value of resistor R4 is 22.6K ohms. More exactly, the currents flowing through R2a will also contribute to voltage at pin 12. Analysis yields $$VP1N12 = \frac{\frac{+5VREF}{RNIC} + \frac{VQ1C}{R2a}}{\frac{1}{R2a} + \frac{1}{RNIC} + \frac{1}{R4}}$$

where R2a has the preferred value of 453K and VQ1C is the collector voltage of Q1.

When Q1 is off and no current flows through the fan, VQ1C can be as high as the voltage in C5, which can vary with line voltage.

Using a nominal value of 15 volts for the voltage on C5 yields pin 12 voltages;

VPIN12=3.4657 for VQ1c=0 volts

VPIN12=3.6844 for VQ1c=15 volts

Thus VPIN12 can more exactly have a range of voltages between 3.4657 and 3.6844 depending on the voltage at the collector of Q1. At pin 13 of operational amplifier U3D, resistor RN1A and thermistor RT1 act as a voltage divider circuit. The preferred value of resistor RN1A is 16.2K ohms, and the preferred value of thermistor RT1 is 100K ohms at a cold start up temperature (25° C.). Accordingly, the initial voltage applied to pin 13 at a cold temperature is approximately 4.3 volts, which will be called $V_{tempvar}$.

At the initial startup of the switched power converter 46, $V_{tempvar}$ is greater than 3.68 v. Thus the output of operational amplifier U3D is near zero causing transistor Q1 to be off and the fan 32 is not running. As the temperature increases, the resistance of thermistor RT1 will decrease causing the value of $V_{tempvar}$ to drop from the initial 4.3 volts. Eventually the temperature will increase such that the value of $V_{tempvar}$ will fall slightly below 3.68 volts. When this occurs the circuit including operational amplifier U3D will enter the linear region. There will be a slight fan voltage but it will probably remain in the stalled condition. If the temperature continues to increase the value of $V_{tempvar}$ will fall significantly below 3.68 v but above 3.46 v and operational amplifier U3D causes the fan to enter the mid speed range. As $V_{tempvar}$ falls further, op-amp U3D turns transistor Q1 full on and the fan 32 reaches full speed.

The fan control circuit 30 provides the variable voltage to control the speed of the fan 32. The transformer circuit 14 provides steady power to the power input of the fan 32. The power input for the fan 32 is connected to pin 3 of transformer T1, through Schottky diode D1a and resistor R20. Pin 7 of transformer T1 is connected to ground, completing the power input circuit for the fan 32. Resistor R20 is used for the purpose of preventing the voltage applied to the fan 32 from exceeding specifications. One plate of capacitor C5 is connected to ground and the other plate is connected between resistor R20 and Schottky diode D1a for the purpose of providing a steady voltage to resistor R20. Capacitor C5 is charged by transformer T1 and carries enough voltage to power the fan 32. Schottky diode D1a prevents capacitor C5 from discharging into pin 3 of transformer T1.

Because the power input to the fan 32 is connected to the primary side of the transformer circuit 14, the fan control circuit 30 as well as the variable voltage controlled fan 32 will remain operational even when the output is heavily loaded or short circuited. Simply stated, this feature will permit the cooling system of the switched power converter to continue to operate in the event of an over-loaded output. Appropriately, the occurrence of this condition is when the operation of the fan 30 is most vital.

Transformer Circuit

Transformer circuit 14 is primarily inclusive of transformer T1. Pin 4 of transformer T1 is the positive input line. Pin 4 is connected to unregulated DC terminal 40, where the DC line voltage is approximately 170 volts. Pins 5 and 6 of transformer T1 are connected to the switching circuit 12. The switching circuit 12 provides a switching current to the primary-input side of transformer T1. For example, switching circuit 12, which is controlled by controller 18, allows current to flow between pins 4 and 5, and between pins 4 and 6. However, the current between pins 4 and 5, and pins 4 and 6 will never flow simultaneously, but will alternate according to controller 18. Operation is described below with reference to FIG. 17.

Switching Circuit

Figure 17:
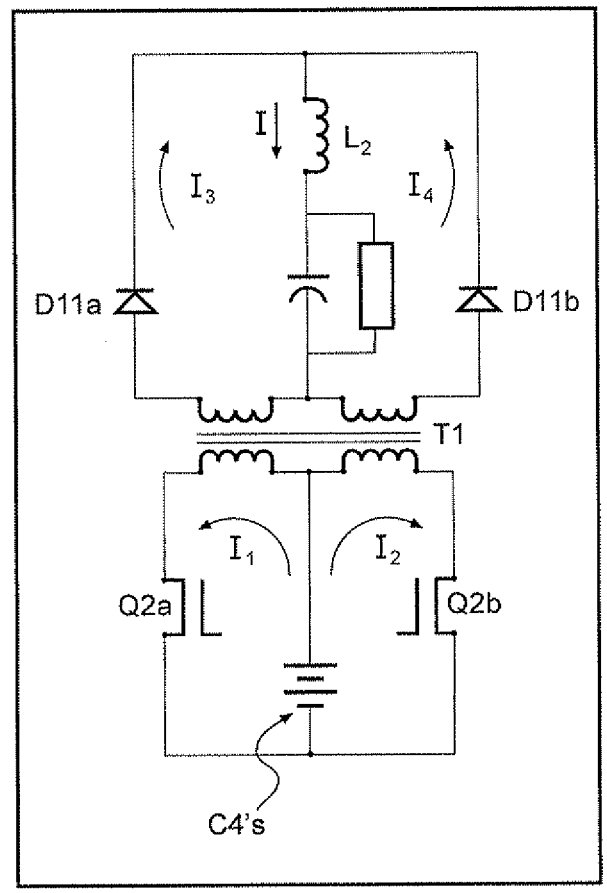
FIG. 17 illustrates the two output current paths generated by the secondary-output side of transformer T1.
Figure 18:
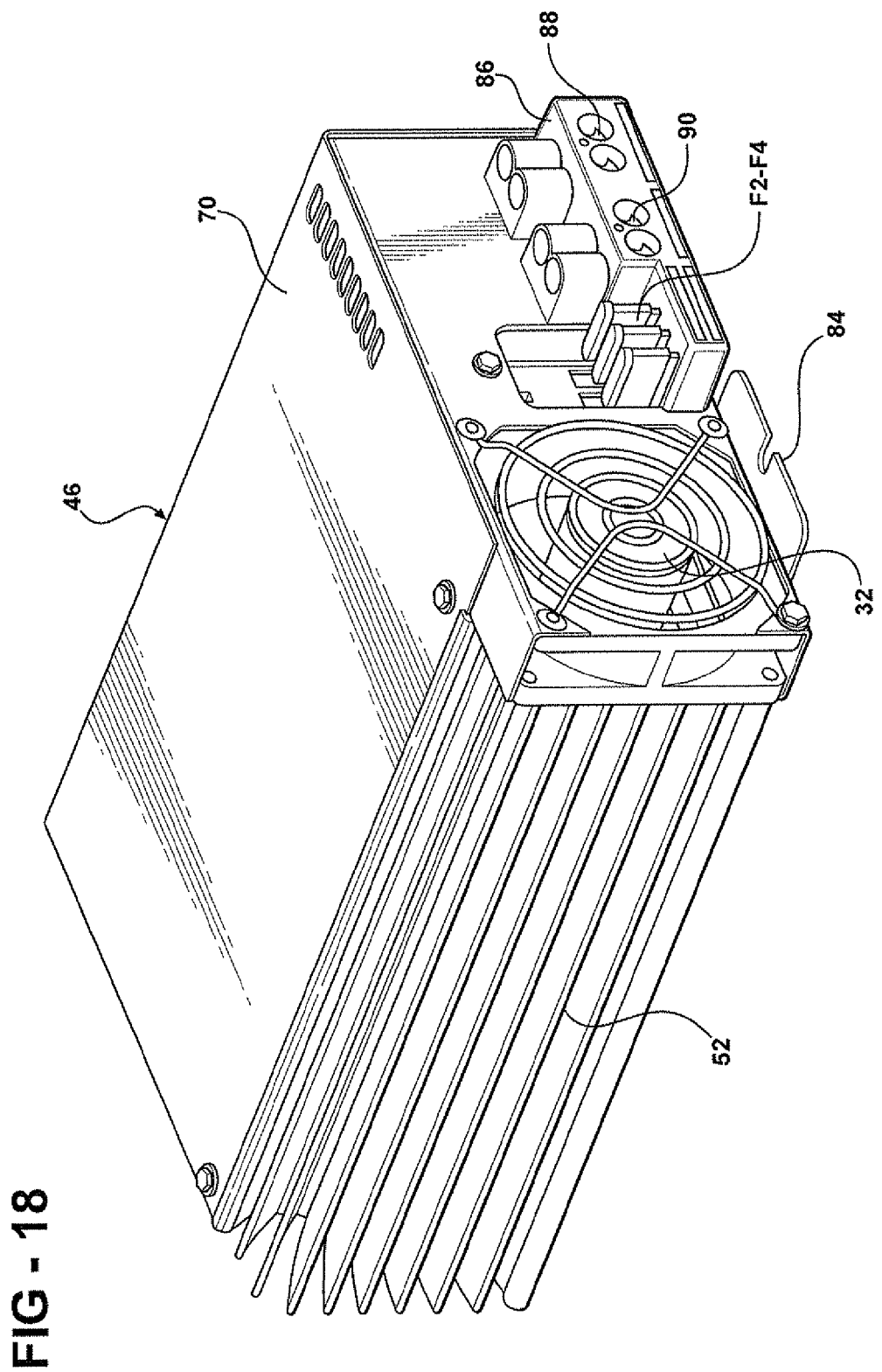
FIG. 18 is a perspective view of a fully packaged power converter embodying the features described herein.
Figure 20:
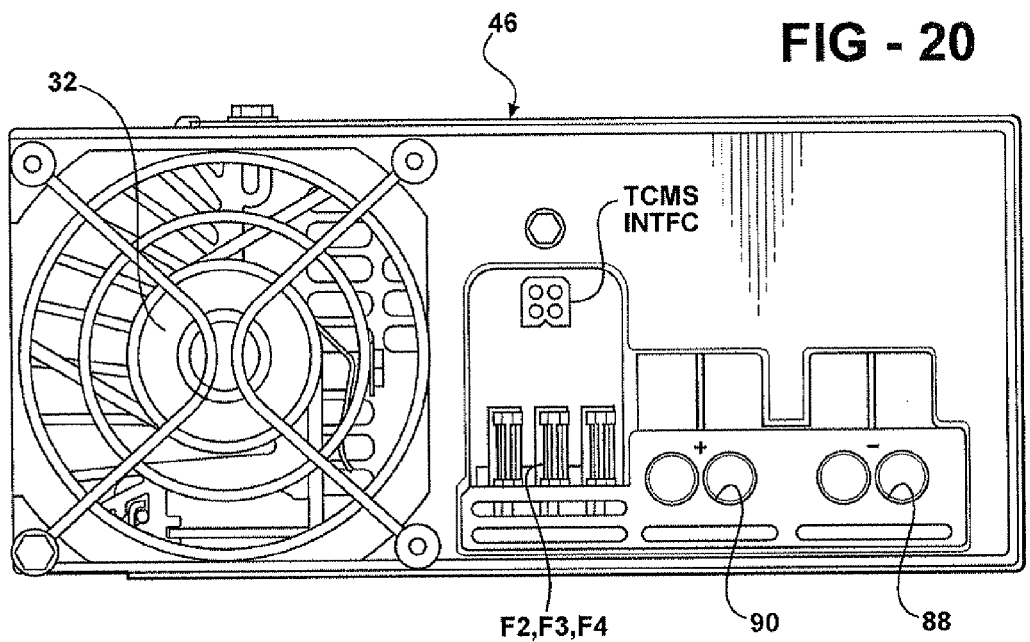
FIG. 20 is an end elevational view of the power converter package of FIG. 18.
Figure 21:
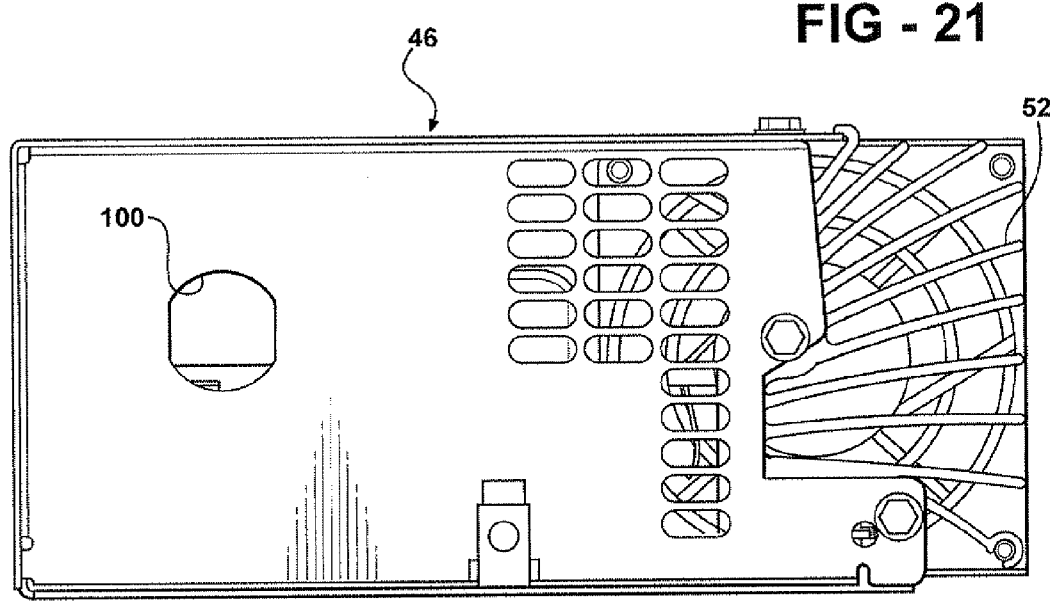
FIG. 21 is an opposite end elevational view of the power converter package of FIG. 18.

As illustrated by FIGS. 2 and 17, the preferred embodiment of the switching circuit 12 contains two transistors Q2a and Q2b. When transistor Q2a is turned on current $I_1$ will flow from pin 4 of transformer T1 to pin 6. Alternatively when transistor Q2b is turned on current $I_2$ will flow from pin 4 of transformer T1 to pin 5. When transistor Q2a is on transistor Q2b will be off, and when transistor Q2b is on, Q2a will be turned off. The primary-input side of transformer T1 is utilized in such a fashion so that the transistors within the switching circuit 12 may operate at up to a maximum 50% duty cycle, meaning that transistors Q2a and Q2b are never on more than 50% of the time.

As further illustrated in FIGS. 2 and 17, the secondary-output side of transformer T1 includes pins 2, 8, and 1. When current $I_2$ flows between pins 4 and 5 of transformer T1, current $I_4$ will correspondingly flow between pins 8 and 2. Alternatively, when current $I_1$ flows between pins 4 and 6 of the primary-input side of transformer T1, current $I_3$ will correspondingly flow between pins 8 and 1 of the secondary-output side. The switching circuit 12 further includes R37, R23a, R23b and C24 (shown only in FIG. 2).

Transistors Q2a and Q2b provide two current loops. Transistor Q2a is connected to pin 6 on the primary side of transformer T1, and transistor Q2b is connected to pin 5 on the primary side of transformer T1. Controller 18 controls the on/off state of transistors Q2a and Q2b. When transistor Q2a is turned on, Q2b is off. Current $I_1$ flows between pins 4 and 6 of transformer T1; alternatively, when transistor Q2b is turned on, Q2a is off and current $I_2$ flows between pins 4 and 5 of transformer T1. The gate of transistor Q2a is connected to resistor R23a which is connected to AOUT (pin 11) on controller 18. The gate of transistor Q2b is connected to resistor R23b which is connected to BOUT (pin 14) on controller 18. When controller 18 applies a voltage to the gate of transistor Q2a, transistor Q2a turns on and allow current $I_1$ to flow from pin 4 of transformer T1, through pin 6, and then to ground through the drain and source of transistor Q2a. Alternatively, when controller 18 applies a voltage to the gate of transistor Q2b, transistor Q2b will turn on and allow current $I_2$ to flow from pin 4 of transformer T1, through pin 5 and to ground through the drain and source of transistor Q2b.

Resistor R37 and capacitor C24 are connected in series between the drain of transistors Q2a and Q2b for the purpose of snubbing the transient drain voltage when transistors Q2a and Q2b are switching.

Controller

Controller 18 is used for controlling the output of the switching circuit 12 by controlling the duty cycles of switching transistors Q2a and Q2b. Controller 18 receives input from the current sensing circuit 34, over-voltage shut-down circuit 20, over-temperature shut-down circuit 28, feedback circuit 16, and foldback circuit 42.

As discussed previously, AOUT (pin 11) and BOUT (pin 14) are connected to transistors Q2a and Q2b respectively for the purpose of controlling the duty cycle and switching current of the switching circuit 12. SHDN (pin 16) is connected to both the output of the over-voltage shutdown circuit 20 and the over-temperature shutdown circuit 28 for the purpose of terminating the operation of the switching circuit 12. If SHDN (pin 16) receives a sufficient voltage AOUT (pin 11) and BOUT (pin 14) will turn off transistors Q2a and Q2b, which will terminate the output across the DC load.

CS+ and CS− are connections to operational amplifier CS, which is internal to controller 18. The output of operational amplifier CS corresponds to the instantaneous voltage output of current sensing circuit 34. CS+ (pin 4) is connected to the output of the current sensing circuit 34, which measures the current through transistors Q2a and Q2b.

EA+, EA−, and COMP are connections on operational amplifier EA, which is internal to controller 18. The output of operational amplifier EA is compared to the output of operational amplifier CS. EA+ (pin 5), is connected to the output of the feedback circuit 16. EA− (pin 6) is connected to COMP (pin 7), acting as a voltage follower on operational amplifier EA. Accordingly, the output of operational amplifier EA will be the same as the voltage applied to EA+ (pin 5).

If the instantaneous output of operational amplifier CS exceeds the output of operational amplifier EA AOUT (pin 11) and BOUT (pin 14) transistors Q2a and Q2b are turned off. If the current generated by transistors Q2a and Q2b exceeds the limit set by feedback circuit 16, controller 18 will temporarily terminate the gate drives to Q2 and Q2b. This comparison/control function occurs on a cycle-by-cycle basis.

CLADJ (pin 1) is used to further limit the current output of the switching circuit 12. The voltage applied to CLADJ (pin 1) limits the maximum current output of the switched power converter. As the voltage applied to CLADJ (pin 1) decreases so does the maximum current output of the switched power converter. CLADJ (pin 1) is connected to the output of the foldback circuit 42, where the foldback circuit will cause the current limit to decrease (i.e. reduce the voltage applied to CLADJ) in a near short circuit situation. CLADJ (pin 1) is also connected between resistors R14 and R15 which act as a voltage divider circuit. Resistor R14 is connected to 5 volt reference 5REF and is in series with resistor R15. Resistor R15 is also connected to ground.

VREF (pin 2) provides a 5.1 volt reference voltage which supplies power to various electrical components within the switched power converter. The output of VREF is identified as 5 volt reference 5REF. VIN (pin 15) is connected to a power supply for the purpose of providing power to controller 18. VIN (pin 15) is connected to Zener diode D9 and capacitor C10 which provide approximately 15 volts to controller 18. Zener diode D9 and capacitor C10 receive voltage from unregulated DC terminal 40 through resistors R24a and R24b.

VC (pin 13) is the power supply for the sales of transistors Q2a and Q2b through AOUT (pin 11) and BOUT (pin 14), respectively. VC (pin 13) is connected to VIN (pin 15) through resistor R16. Resistor R16 is used to limit the current entering VC (pin 13). Schottky diodes D16a, D15a, D15b and D16b are used to prevent the voltage on AOUT (pin 11) and BOUT (pin 14) from exceeding VIN or from dropping below GND.

GND (pin 12) is connected to ground. Capacitor C25 is connected to CT (pin 8) and resistor R13 is connected to RT (pin 9) for setting the frequency and maximum duty cycle of controller 18. Capacitor C25 and resistor R13 are also connected to ground. SYNC (pin 10) is not utilized.

Foldback Circuit

As briefly mentioned, foldback circuit 42 provides feedback to controller 18 for the purpose of reducing the duty cycle of transistors Q2a and Q2b under near short circuit conditions rather than allowing the output current across the DC load to increase out of control. Foldback circuit 42 includes, diode D4, resistors R19a, R19b, R17, and R18, capacitor C8, and operational amplifier U3C. Operational amplifier U3C has the following connections: pin 8 is the output, pin 9 is the negative input, pin 10 is the positive input, pin 4 is connected to 5 volt reference 5REF, and pin 11 is connected to ground.

The foldback circuit 42 measures the duty cycle of transistors Q2a and Q2b. Pin 10 is connected to AOUT (pin 11) and BOUT (pin 14) on controller 18 through resistors R19a and R19b.

Capacitor C8, which is connected between pin 10 and ground, as well as in series with resistors R19a and R19b is used for the purpose of averaging the duty cycle controlled gate voltages of transistors Q2a and Q2b. Resistor R17 is connected between 5 volt reference 5REF and pin 10, and resistor R18 is connected between pin 10 and ground for the purpose of creating a voltage divider circuit to reduce the voltage applied to pin 10. Pin 9 is connected to pin 8 for the purpose of creating a voltage follower, such that the voltage at pin 8 will always equal the voltage applied to pin 10. Pin 8 is also connected to the cathode of diode D4, and the anode of diode D4 is connected to CLADJ (pin 1) of controller 18.

As the duty cycle of AOUT (pin 11) and BOUT (pin 14) increases, the voltage of capacitor C8 increases as well as the voltage on pin 10. Accordingly, the voltage on pin 8 will be higher than the voltage between resistors R15 and R14. When this occurs, diode D4 will be reverse biased and the voltage at CLADJ (pin 1) of controller 18 will not be affected. In this situation the current limit of CLADJ will neither decrease nor increase because foldback circuit 42 is not pulling current from CLADJ (pin 1).

As the duty cycle of AOUT (pin 11) and BOUT (pin 14) decreases, the voltage of capacitor C8 decreases as well as the voltage on pin 10. Accordingly, the voltage on pin 8 will be lower than the voltage between resistors R15 and R14. When this occurs, diode D4 will be forward biased and the voltage at CLADJ (pin 1) of controller 18 will be pulled down. As the voltage applied to CLADJ (pin 1) decreases, the maximum current output of controller 18 will also decrease. Accordingly, in the event of a near short circuit at the DC load, the reduced current limitation of CLADJ will prohibit the current output from going unreasonably high and reduce the output current to less than its previous maximum rating.

Voltage Feedback Circuit

The feedback circuit 16 measures the voltage across the DC load and outputs a reference voltage to controller 18. Controller 18 contains an internal voltage controller, for the purpose of providing a voltage controlled current source. Controller 18 will control the switching of transistors Q2a and Q2b accordingly. Feedback circuit 16 includes resistors R28, R34, R32, R26, R25, R33 and R30, capacitors C27, C22, C20, and C28, and optical coupler U2 which includes a LED, a photo-sensor and a 2.5 volt reference.

When the DC load is increased, there is an immediate drop in voltage across the DC output terminals of the power converter. This drop in voltage requires an increase of output current in the output circuit 44 in order to meet the new load demands. Alternatively, when the DC load is decreased, there is an immediate increase in voltage. This increase in voltage requires a decrease in the output current of the output circuit 44 in order to compensate for the load reduction.

For example, when the operator of the switched power converter brings an additional load on-line, the feedback circuit 16 first measures the voltage across the load and then scales the voltage down to a 2.5 volt range. Because a new load has been added the measured voltage will be below the 2.5 voltage range. Optical coupler U2 will compare the measured voltage (scaled down) against a 2.5 volt reference. Because the measured voltage across the load will be below the 2.5 reference voltage, optical coupler U2 will cause the LED to produce less light. When the LED produces less light the photo-sensor will cause the output of the feedback circuit to increase in voltage. The output of the photo-sensor is connected to EA+ (pin 5) on controller 18. When the voltage input of EA+ (pin 5) increases, the voltage controller within controller 18 will temporarily increase the duty cycle of the switching circuit 12. This in turn increases the load current to meet the new load demand (i.e. get the voltage across the DC load back up to 13.6 volts).

Alternatively, when the operator of the switched power converter removes a load, the feedback circuit 16 measures the voltage across the load and then scales the voltage down to a 2.5 volt range. Because a load has been removed the measured voltage will be above the 2.5 voltage range. Opto-coupler U2 will compare the measured voltage (scaled down) against a 2.5 volt reference. Now, because the measured voltage across the load will be above the 2.5 reference voltage, opto-coupler U2 will cause the LED to produce additional light. When the LED produces additional light the output of the feedback circuit will decrease in voltage. The output of the photo-sensor is connected to EA+ (pin 5) on controller 18. When the voltage input of EA+ (pin 5) decreases, the voltage controller within controller 18 will temporarily decrease the duty cycle of the switching circuit 12. This in turn, decreases the load current to meet the reduced load demand (i.e. get the voltage across the DC load back down to 13.6 volts).

Resistor R25 limits current to opto-coupler U2. Resistor R26 and R28 are arranged as a voltage divider to provide a scaled output voltage in the vicinity of 2.5 volts. Capacitors C20, C22, C27, C28, R34, R32 and R33 are used for stability, do not affect the DC levels whatsoever as they carry no DC current. Resistor R30 is used for providing an input voltage to EA+ (pin 5) of controller 18 based on the current output of opto-coupler U2.

Current Sensing Circuit

Current sensing circuit 34 is used to measure the current being drawn by transistors Q2a and Q2b and to send the measured current to CS+ (pin 4) of controller 18. Controller 18 then compares this measured current to a reference level. The reference level is the output of feedback circuit 16, which is connected to EA+ (pin 5) on controller 18. Depending upon the measured current and the reference level, controller 18 will control the on/off state of transistors Q2a and Q2b.

Current sensing circuit 34 includes transformer T4, diodes D24a, D24b, D24c, and D24d, resistors R21, R21a, R21b, R21c, R21d, and R21e, and capacitor C9. The drain of transistor Q2b is connected to pin 4 of transformer T4, and the drain of transistor Q2a is connected pin 6 of transformer T4. The output side of transformer T4 (pins 1 and 2) is connected to a series of diodes and resistors and then to CS+ (pin 4) of controller 18.

Diodes D24a, D24b, D24c, and D24d make up a full wave rectifier bridge. Diodes D24c and D24b are connected in parallel to the output side of transformer T4, where the cathode of diode D24c is connected to pin 1 of transformer T4 and the cathode of diode D24b is connected to pin 2 of transformer T4. The anodes of diodes D24b and D24c are both connected to ground. Diodes D24d and D24a are also connected in parallel to the output side of transformer T4, where the anode of diode D24d is connected to pin 1 of transformer T4 and the anode of diode D24a is connected to pin 2 of transformer T4. The cathodes of diodes D24a and D24d are connected to CS+ (pin 4) of controller 18 as well as a series of resistors and a capacitor.

For example, when transistor Q2a is turned on, the current from transformer T4 will flow from pin 1 of the transformer, through diode D24d and through resistors R21, returning through D24b to pin 2. A voltage representing the flow of this current through R21 is connected to pin 4 of CS+ in controller 18. When transistor Q2b is turned on, the current from transformer T4 will flow from pin 2 of the transformer through D24a and through R21 (to ground) and then returning through R24c to ground to pin 1 of T4. Again, the voltage on R21 resistors is fed to CS+, the op-amp in controller 18.

Resistors R21, R21a, R21b, R21c, R21d, and R21e, and capacitor C9 are all connected in parallel. The current output of diodes D24d and D24a are connected to the high side of resistors R21, R21a, R21b, R21c, R21d, and R21e, and capacitor C9. The low side of resistors R21, R21a, R21b, R21c, R21d, and R21e, and capacitor C9 are connected to ground. This parallel resistor-capacitor circuit is used for the purpose of ensuring the voltage applied to CS+ (pin 4) of controller 18 is in the 1 volt range.

Output Circuit

The secondary-output side of transformer T1 is connected to the DC load through a series of circuit elements making up the output rectifier and LC filter circuit 44. The output circuit 44 includes capacitors C19, C11, C13A, C12, C14A, C17, and C18, schottky diodes D11a and D11b, diode D12, resistor R29, inductor L2, fuses F2, F3, and F4, inductor beads L3, L4, L10, and L11, and heavy gauge wires 105, 106, and 107. The DC load is connected in parallel with capacitors C11, C13A, C12, C14A, C17, and C18 (DC load capacitors), which are in series with inductor L2. The output circuit 44 is integral with the transformer secondary and includes two current loops with the current going in the same direction through inductor L2, the DC load capacitors, and the DC load (FIG. 17).

As further illustrated by FIG. 17 when transistor Q2a is turned on (Q2b is off) current $I_1$ will flow between pin 4 and pin 6 (primary-input side of transformer T1) in a counter-clockwise direction. Current $I_1$ will cause current $I_3$ to flow between pin 8 and pin 1 (secondary side of transformer T1) in a clockwise direction. Alternatively, when transistor Q2b is turned on (Q2a is off) current $I_2$ will flow between pin 4 and pin 5 (primary-input side of transformer T1) in a clockwise direction. Current $I_2$ will cause current $I_4$ to flow between pin 8 and pin 2 (secondary side of transformer T1) in a counter-clockwise direction. As illustrated the current ($I_4$ and $I_3$) applied to inductor L2 is always going in the same direction.

Further explained, when transistor Q2a is turned on, current flows in the secondary-output side of transformer T1 from pin 1 through schottky diode D11a, through inductor L2. The DC load capacitors will be charged and current will be delivered to the DC load and back through pin 8 of the transformer. When transistor Q2b is turned on, current flows in the secondary side of transformer T1 from pin 2 through schottky diode D11b, through inductor L2, the DC load capacitors will be charged and current will be delivered to the DC load and then back through pin 8 of the transformer.

Resistor 29 and capacitor C19 are connected in series between secondary-output pins 2 and 1 of transformer T1 for the purpose of eliminating transient voltages. Inductor beads L3, L4, L10, L11, are connected between the secondary-output side of transformer T1 and schottky diodes D11a and D11b. Inductor beads L3, L4, L10 and L11 are placed on the leads of D11A and D11B, for the purpose of reducing transient noise. The DC load capacitors which are connected in parallel with the DC load are arranged as follows. Capacitor C11 is the main output capacitor. The positive plate of capacitor C11 is connected to the positive terminal of the DC load P4 and the negative plate is connected to the negative terminal of the DC load P1.

The remaining capacitors are used for the purpose of reducing noise. Capacitor C12 is connected in parallel with the DC load, where one plate of capacitor C12 is connected to the positive terminal of the DC load P4, and the other plate of capacitor C12 is connected to the negative terminal of the DC load P1. Capacitors C13A and C14A are connected in series, where one plate of capacitor C13A is connected to the positive terminal of the DC load P4, and one plate of capacitor C14A is connected to the negative terminal of the DC load P1. The remaining plates of capacitors C13A and C14A are connected to chassis ground. Capacitors C17 and C18 are also connected in series, where one plate of capacitor C17 is connected to the positive terminal of the DC load P4, and one plate of capacitor C18 is connected to the negative terminal of the DC load P1. The remaining plates of capacitors C17 and C18 are connected to chassis ground. Fuses F2, F3, and F4 are connected in series with inductor L2 and work in conjunction with diodes D11a and D11b to provide reverse battery protection.

The illustrated embodiment of this invention also includes the use of heavy gauge wires which supplement the copper laminations on the circuit board. Heavy gauge wires 105 are connected directly between the negative output (terminal 8) of transformer T1 and the negative terminal of DC load P1 (i.e. DC negative output 88) Heavy gauge wires 106 are connected directly between schottky diodes D11A and the input of inductor L2. Heavy gauge wires 106 are also connected directly between schottky diodes D11B and the input of inductor L2. Heavy gauge wires 107 are connected directly between the output of inductor L2 and fuses F2, F3, and F4. The output of fuses F2, F3, and F4 are connected to the positive terminal of DC load P4 (i.e. DC positive output 90).

Waveforms

FIG. 5 illustrates waveforms found at various points in the circuit of FIG. 17 under normal operating conditions. FIG. 5A shows the voltages across the two power transistors Q2a and Q2b during a complete cycle of operation. One voltage is the complement of the other. FIG. 5B shows the voltages across the primary windings of transformer T1 during one complete cycle of switch operation. FIG. 5C illustrates the current waveforms 11 and 12 through the primary loops of FIG. 17.

Figure 5B:
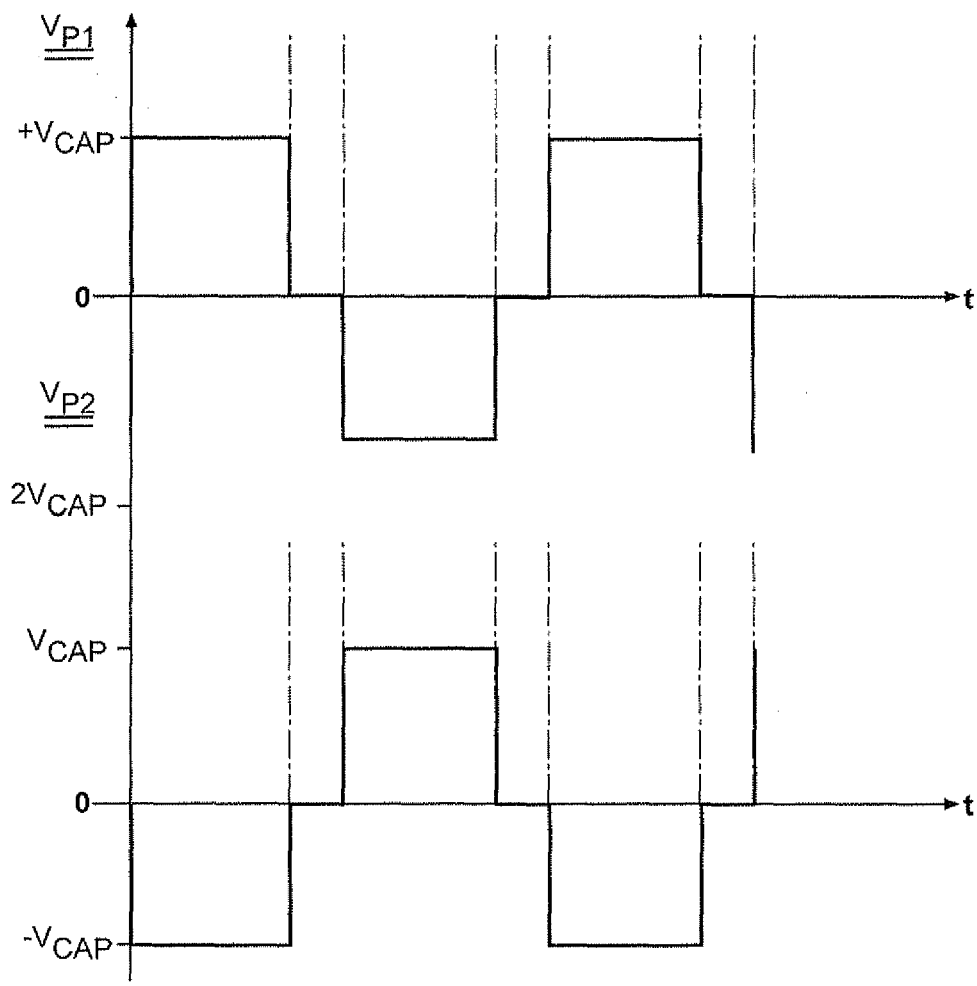
FIG. 5 shows various waveforms within the circuit of FIG. 17.
Figure 5D:
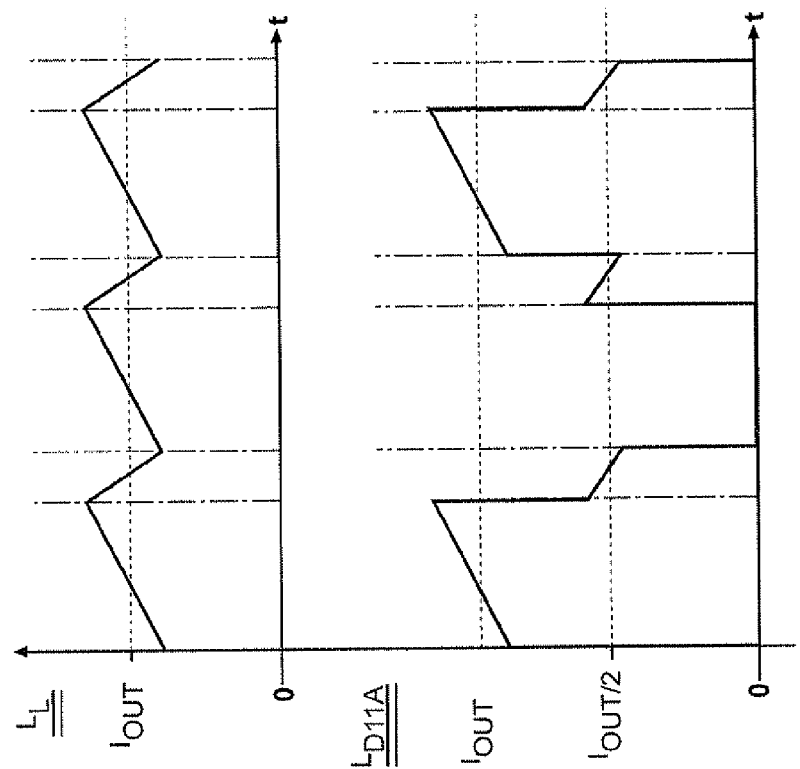
Figure 5C:
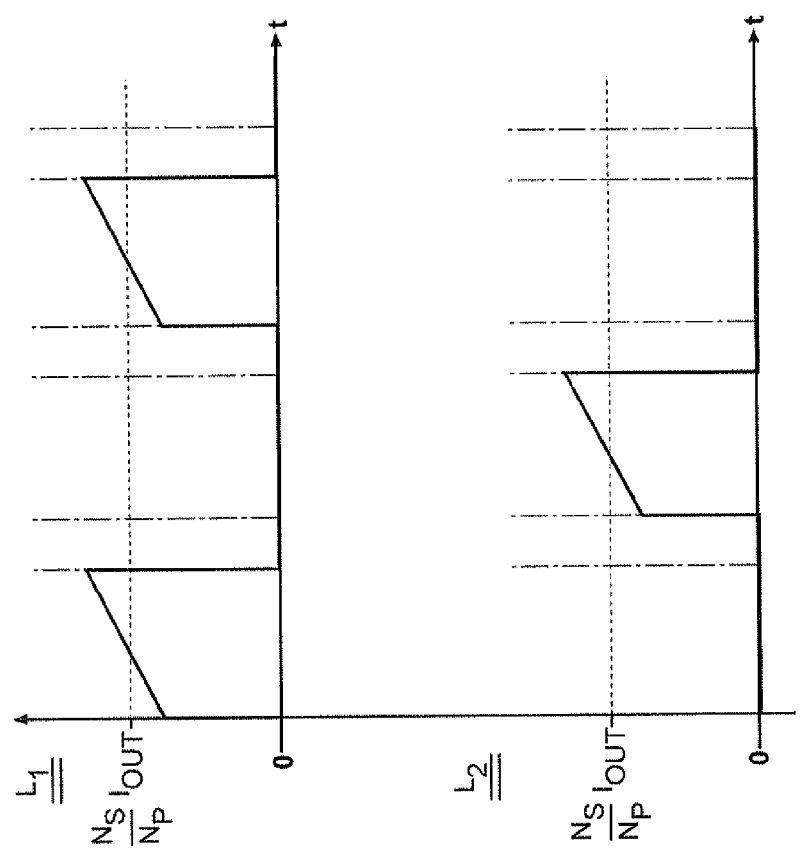

FIG. 5D shows the current through inductor L2.

Figure 5F:
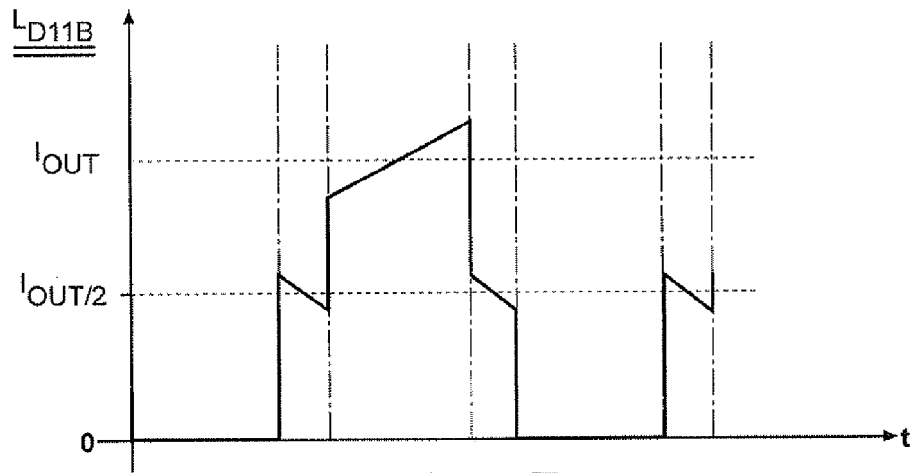

FIG. 5F shows the secondary current $I_4$ through diode D11b.

Figure 5G:
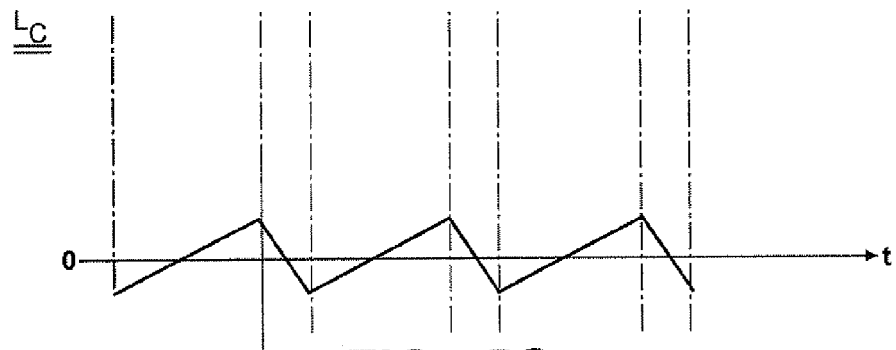

FIG. 5G shows the current through C11.

Figure 5H:
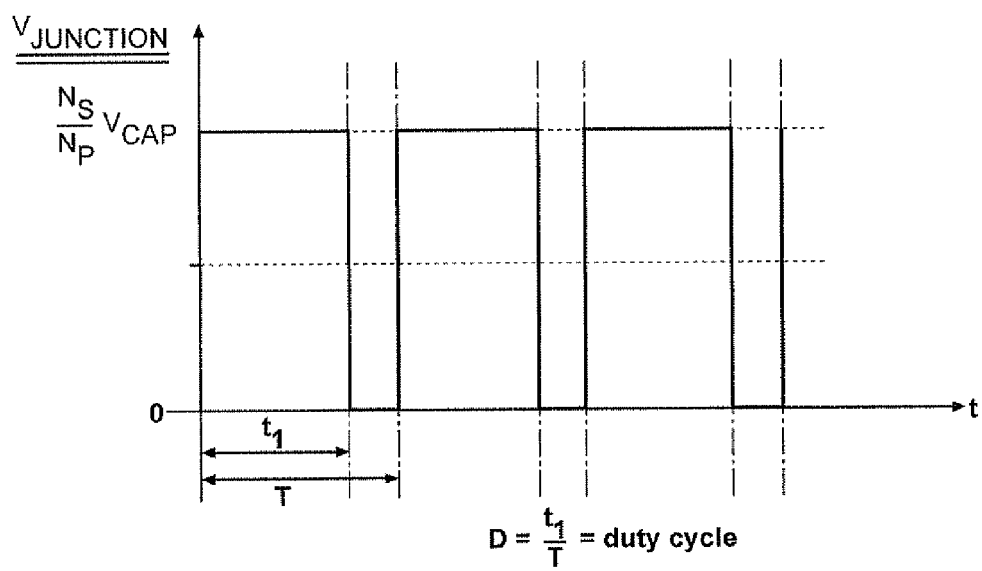

FIG. 5H shows the voltage at the top of the circuit of FIG. 17; i.e., the top of L2.

Permanent Reverse Battery Indicator

The permanent reverse battery connection indicator 24 is diode D12. Diode D12 and capacitor C11 are connected in parallel. The cathode of diode D12 is connected to the positive plate of capacitor C11 which is connected to the positive terminal of the DC load P4. The anode of diode D12 is connected to the negative plate of capacitor C11 which is connected in to the negative terminal of the DC load P1. If a reverse battery connection is applied to the DC load output of the power converter, diode D12 will blow before fuses F2-F4 open circuit, permanently indicating that a reverse battery connection has occurred. If F2-F4 blow, they may be replaced or reset and the converter 46 will be fully operational even if D12 is not replaced.

Packaging a Commercial Device

Having described the preferred power conversion circuit, the packaging of a commercial embodiment will be described in detail with reference to FIGS. 18-26.

The commercial embodiment of converter 46 comprises a rectangular sheet metal housing 70 attached by screws to a finned aluminum extrusion 52 which forms the aforementioned heat sink for the FET's Q2a and Q2b, diode D11a and D11b, and the thermistor RT1. These components are held against a large flat surface 53 of heat sink 52 by spring clips 55 which are screwed into the heat sink extrusion in the manner shown in FIG. 19. The fan 32 is mounted by screws 57 onto an end of the heat sink extrusion 52 in which a relief 59 of circular design has been machined. The surfaces of the relief 59 lie below the end surfaces 61 of the fins 65 and the screw base 63 on which the fan 32 is mounted. This relief creates an air gap between the fan motor 50 and the heat sink which prevents heat from the sink reaching the fan motor. Numerous vents 58 are formed in the top and back plates of the housing 70.

Figure 22:
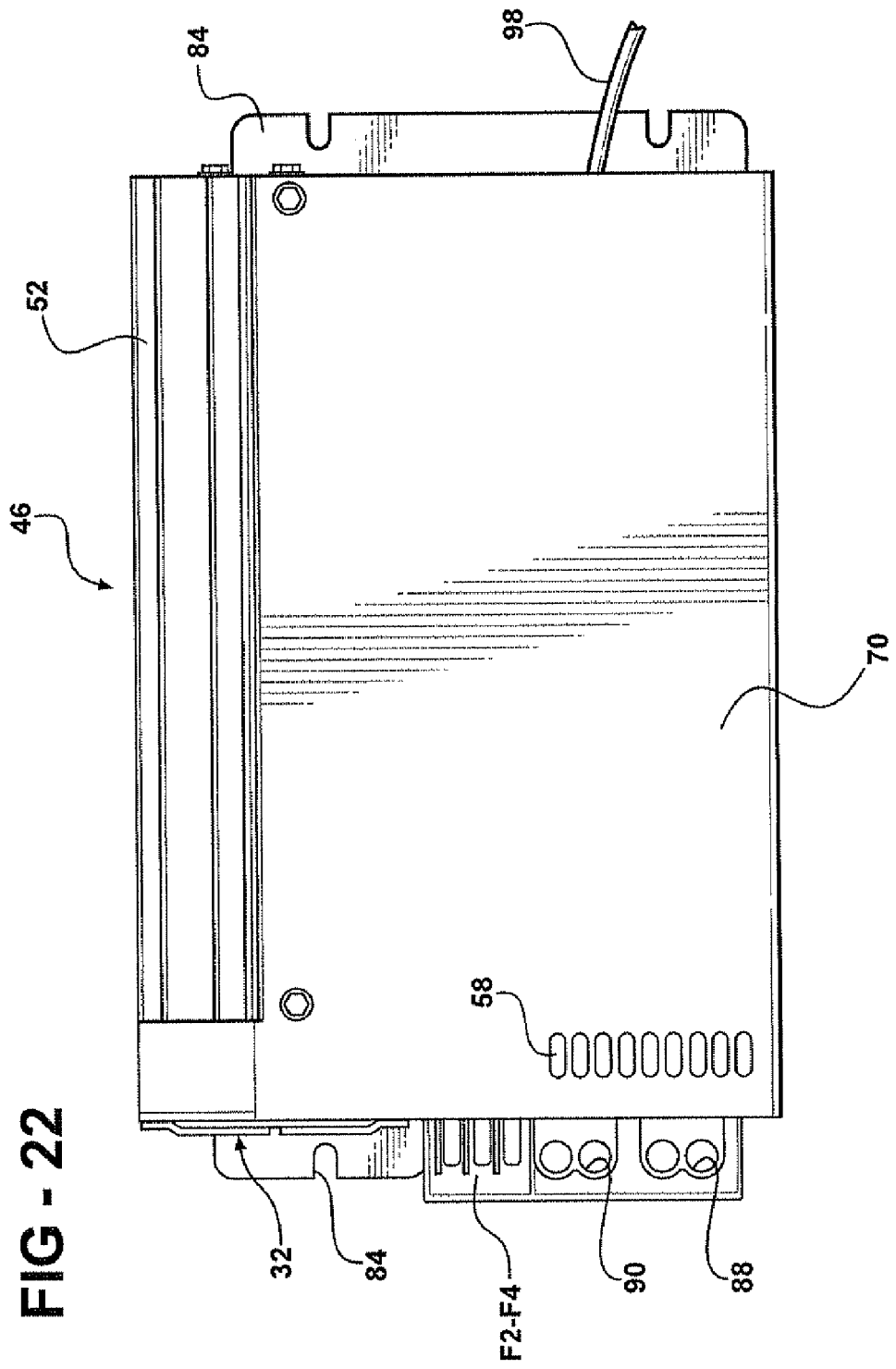
FIG. 22 is a top plan view of the switched power converter package of FIG. 18.
Figure 24:
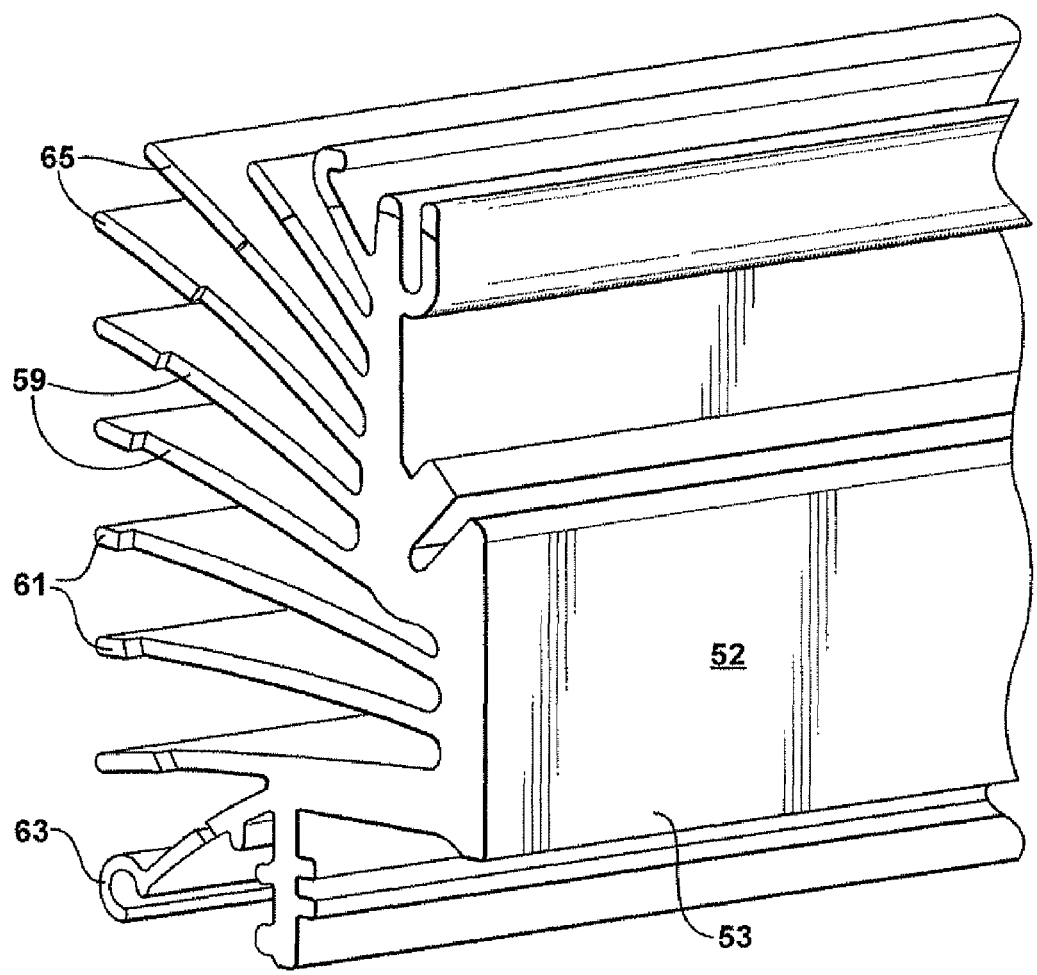
FIG. 24 is a perspective view of the heat sink of FIG. 19 showing a recess or relief in the fan mounting surface.

Flanges 84 are provided on both ends of housing 70 for mounting purposes. Fuses F2-F4 are mounted outside the housing 70 for ease of replacement. Fuse Fx1, however, is inside the housing for reasons described above. The positive output terminals 90 and the negative output terminals 88 are mounted on the left side of housing 70 as shown in FIG. 22. A power cord 98 extends from housing 70 through aperture 100.

Figure 25:
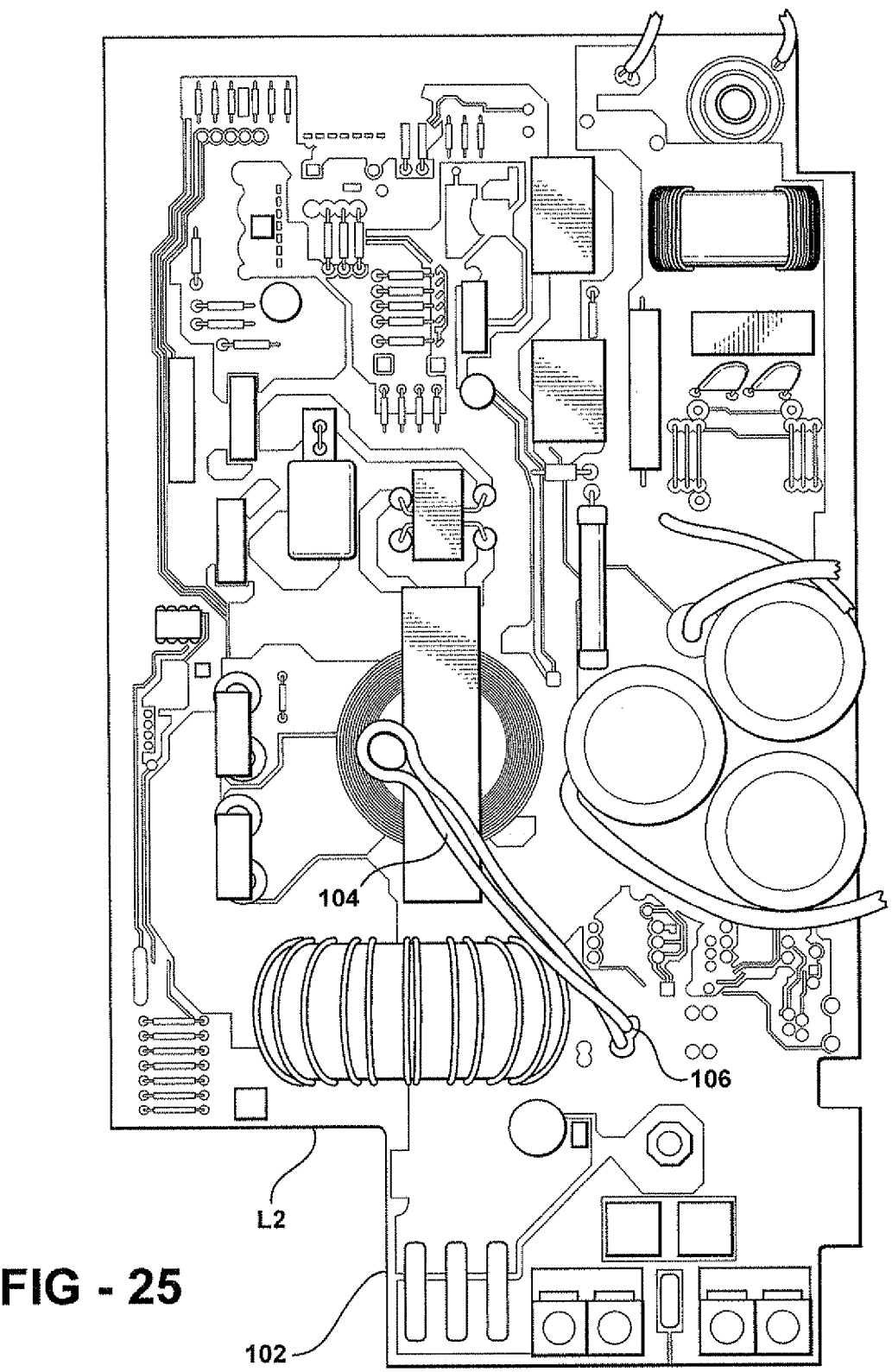
FIG. 25 is a photograph of one side of the circuit board used to support the components in the circuit of FIG. 2 showing heavy wires connected from the center top of the transformer through the circuit board.
Figure 26:
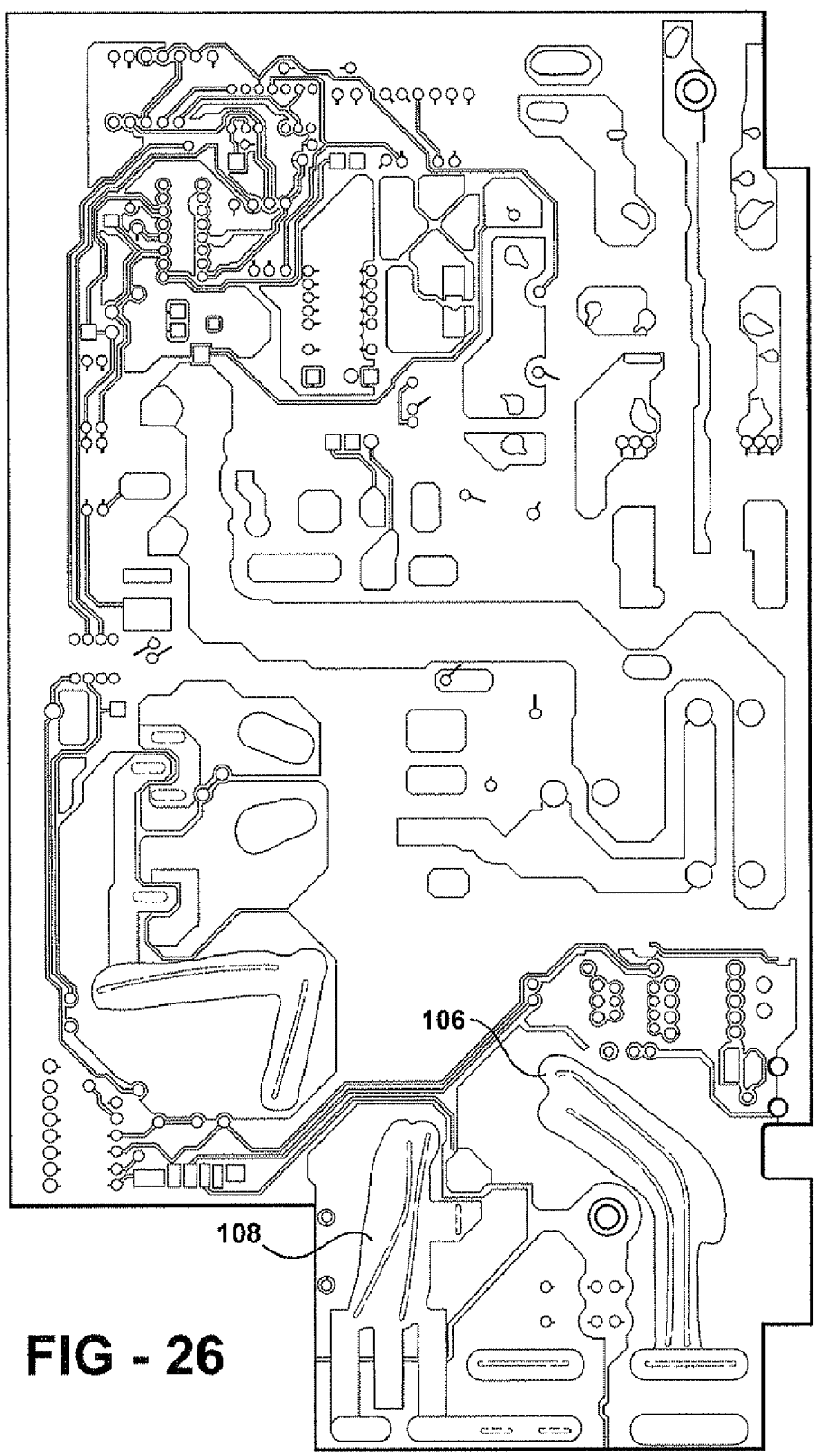
FIG. 26 is a photograph of the reverse side of the circuit board, with the image reversed to coincide with the orientation of the FIG. 25 photograph, showing the heavy wires from the transformer coming through the circuit board and soldered over the conductive traces leading to the negative output terminal. This photograph also shows additional heavy wires running from the fuses to the positive output terminal and also soldered to and in overlying relation to circuit board traces.

The components in the circuit of FIG. 2 are mounted on a conventional circuit board 102 which is secured by fasteners within housing 70. The board 102 has conductive traces on both sides as shown in FIGS. 25 and 26. The inductor L2 is mounted on board 102 as shown in FIG. 25 along with the transformer T1 (central in FIG. 25). Two No. 12 gauge wires 104 run from the center tap of T1 to a point 106 where they pass through a hole in board 102 and emerge on the other side as shown in FIG. 26. From there to the negative output terminal 88 the wires overlie a copper trace and are soldered to the trace to lower the resistance of this high current path and increase the robustness of it as well. The leads 108 from L2 to the fuses F2-F4 and the positive outputs 90 are similarly constructed.

FIG. 23 shows the converter 46 mounted within an RV 109 having a storage battery 114. A power cord 112 brings 115 vac to the converter from a pedestal 111 of the type found in RV parks. The converter 46 is connected into the electrical system of the RV in a known manner.

Referring again to FIG. 2 the circuit for the converter 46 is here equipped with a 4-wire terminal H2 of which pin 4 is connected to the converter output fuses F2-F4 via a 100 Ohm resistor R57. The terminal H2 allows the converter to be connected to an external "management" system of the type described in U.S. Pat. No. 5,982,643 issued Nov. 9, 1999 to Thomas H. Phlipot and assigned to Progressive Dynamics, Inc. As is more completely described in the '643 patent, the management system includes a microcontroller which gives the owner the option of various operating modes and various converter output voltages; e.g., 13.6 v for normal operation, 13.2 v for storage, and 14.4 v for boost.

Miscellaneous—Options

FIG. 2 also illustrates a terminal H4 connected to ground via R51, R31 and C21. Terminal H4 is a two-contact terminal which is shorted out with a small bridge wire if a gel cell is used in place of the normal lead-acid liquid storage battery 114 in the RV. This lowers the operating voltages of the converter 46 by 0.4 v and is a convenient option for owners who wish to use gel cell storage batteries While the present invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. It is also to be understood that it is the inventor's intent to claim all novel subject matter contained within this disclosure.

VALUES OF LISTED COMPONENTS

| | | |
|---|---|---|
| C1 | Capacitor | 0.47 uF |
| C10 | Capacitor | 220 uF |
| C11 | Capacitor | 16 V |
| C12 | Capacitor | 0.01 uF |
| C13A | Capacitor | 0.01 uF |
| C14A | Capacitor | 0.01 uF |
| C15 | Capacitor | 2.2 nF |
| C16 | Capacitor | 2.2 nF |
| C17 | capacitor | 0.047 uF |
| C18 | capacitor | 0.047 uF |
| C19 | capacitor | 0.001 uF |
| C2 | capacitor | 2.2 nF |
| C20 | capacitor | 0.015 uF |
| C22 | capacitor | 0.47 uF |
| C24 | capacitor | 270 pF |
| C25 | capacitor | 0.12 uF, 2% |
| C26 | capacitor | 0.47 uF |
| C27 | capacitor | 1000 pF |
| C28 | capacitor | 0.1 uF |
| C29 | capacitor | 2.2 nF |
| C3 | capacitor | 2.2 nF |
| C30 | capacitor | 0.47 uF |
| C31 | capacitor | 2.2 nF |
| C4a | capacitor | 820 uF, 250 V |
| C4b | capacitor | 820 uF, 250 V |
| C4c | capacitor | 820 uF, 250 V |
| C5 | capacitor | 100 uF, 35 V |
| C7 | capacitor | 0.1 uF |
| C8 | capacitor | 0.1 uF |
| C9 | capacitor | 0.01 uF |
| D10 | zener diode | 13 V |
| D11a | schottky diode | 40 A, 100 V |
| D11b | schottky diode | 40 A, 100 V |
| D12 | diode | |
| D15a | schottky diode | 1 A, 20 V |
| D15b | schottky diode | 1 A, 20 V |
| D16a | schottky diode | 1 A, 20 V |
| D16b | schottky diode | 1 A, 20 V |
| D1a | schottky diode | 1 A, 100 V |
| D23 | zener diode | 220 V, 5 W, 5% |
| D24a | diode | 75 V, 150 mA |
| D24b | diode | 75 V, 150 mA |
| D24c | diode | 75 V, 150 mA |
| D24d | diode | 75 V, 150 mA |
| D27 | schottky diode | 1 A, 20 V |
| D3 | schottky diode | 1 A, 20 V |
| D4 | diode | 75 V, 150 mA |
| D9 | zener diode | 15 V, 2 W |
| DB1 | diode bridge | 20 A, 400 V Bridge |
| F1 | fuse | 15 A |
| F2 | fuse | 30 A |
| F3 | fuse | 30 A |
| F4 | fuse | 30 A |
| Fx1 | fuse | 0.5 A |
| L2 | inductor | 20 uH |
| Q1 | transistor | 5 A, 40 V |
| Q2a | transistor | 24 A, 500 V, .20 on resistance |
| Q2b | transistor | 24 A, 500 V, .20 on resistance |
| R1 | resistor | 390 Ohm, 5% |

-continued
VALUES OF LISTED COMPONENTS

| | | |
|---|---|---|
| R13 | resistor | 1.82K |
| R14 | resistor | 16.2K |
| R15 | resistor | 35.7K |
| R16 | resistor | 1.8K, 5% |
| R17 | resistor | 5.49K |
| R18 | resistor | 15.4K |
| R19a | resistor | 12.1K |
| R19b | resistor | 12.1K |
| R20 | resistor | 50 Ohm, 5%, 3 W |
| R21 | resistor | 18.7 Ohm |
| R21A | resistor | 422 Ohm |
| R21B | resistor | 422 Ohm |
| R21C | resistor | 845 Ohm |
| R21D | resistor | 845 Ohm |
| R21E | resistor | 1690 Ohm |
| R23a | resistor | 15 Ohm, 5% |
| R23b | resistor | 15 Ohm, 5% |
| R24a | resistor | 1.5K, 5%, 10 W |
| R24b | resistor | 1.5K, 5%, 10 W |
| R25 | resistor | 1K, 5%, ½ W |
| R26 | resistor | 31.2K or 30.1K |
| R28 | resistor | 6.98K, ¼% |
| R29 | resistor | 10 Ohm, 5% |
| R2a | resistor | 453K |
| R30 | resistor | 4.7K |
| R33 | resistor | 3.24K |
| R34 | resistor | 3.24K |
| R37 | resistor | 100 Ohm, 5%, 10 W |
| R38 | resistor | 84.5K, 0.5 W |
| R39 | resistor | 866 Ohm |
| R4 | resistor | 22.6K |
| R40 | resistor | 97.6K |
| R7 | resistor | 32.4K |
| R8 | resistor | 499K |
| RN1A | resistor | 16.2K |
| RN1B | resistor | 47.5K |
| RN1C | resistor | 9.53K |
| RT1 | thermistor | 100K |
| RT2 | thermistor | 1 Ohm |
| T1 | transformer | 2:13:13:2:2 |
| T2 | CMC transformer | custom |
| T3 | CMC transformer | custom |
| T4 | transformer | 80 MH |
| U2 | optically isolated amplifier | FOD2741 |
| U3A | operational amplifier | LM2902 |
| U3B | operational amplifier | LM2902 |
| U3C | operational amplifier | LM2902 |
| U3D | operational amplifier | LM2902 |

The invention claimed is:

1. A power converter comprising:

an input;

a switch circuit including at least one power transistor;

a controller circuit for cycling the switch circuit in a variable duty cycle mode;

and a step-down transformer having a high voltage primary side connected to the switch circuit and a low voltage secondary side connected to a converter output;

a fan having an electric motor;

a supply circuit connected between the primary side of the transformer and the fan motor; and a control circuit for operating the fan in a variable speed mode;

wherein the control circuit comprises a comparator having two inputs and an output;

a grounded thermistor connected to one input;

a switch connected in series with the fan motor and the supply circuit; and the output of the comparator being connected to control the state of the switch to make and break current flow from the supply circuit to the fan motor.

2. A power converter as defined in claim 1 wherein the controller further comprises a heat sink, the thermistor and the at least one power transistor being mounted on the heat sink.

3. A power converter as defined in claim 1 further comprising a shut down circuit including a second set point amplifier connected to receive an input from said thermistor and having an output connected to said controller to stop cycling the switch when the second set point is reached.

4. A power converter having an input, an output, a switch including a power transistor, and a controller for operating the switch in a variable duty cycle mode, a temperature sensor and a fan, the power convertor further comprising a step-down transformer having a high voltage primary side connected to the switch and a low voltage secondary side connected to a convertor output;
 a supply circuit connected between the primary side of the transformer and the fan,
 a first set point device having an input connected to said sensor and an output connected to said fan for changing fan speed; and
  a second set point device having an input connected to said sensor, and an output connected to said controller to disable the switch.

5. The converter of claim 4 wherein the first and second set point devices are op-amps.

6. The converter of claim 4 wherein the sensor is a grounded thermistor.

7. The converter of claim 4 further including a housing and a heat sink attached to the housing; the sensor and the power transistor being mounted in direct thermal exchange with the heat sink.

8. A power converter of claim 7 wherein the ran is mounted to the heat sink.

9. A power converter as defined in claim 8 wherein the heat sink is a finned metal body with a mounting end, the surface of said end being relieved to form an air gap between the fan and the heat sink.

10. A power converter including a power switch, a controller for varying the duty cycle of the switch, a heat sink for the switch and a fan and fan supply voltage source for causing the fan to cause air to flow over the heat sink, the converter further comprising:
 a heat sensor; and
 a fan control circuit, the fan control circuit being operative to control the supply voltage source to vary the speed of the fan in response to increasing temperature of said sensor;
 wherein the control circuit includes an op-amp, the sensor being grounded and connected to provide an input to the op amp and the op amp being connected to regulate the fan supply voltage wherein the op an includes a feedback circuit which produces an oscillatory output from the op amp.

11. A power converter as defined in claim 10 further including a second op-amp having an input connected to the sensor, said second op-amp being connected to a shut down pin in said controller.

12. A converter as defined in claim 11 wherein the heat sink is a finned metal body; said switch having at least one current-carrying component attached to the heat sink.

13. A converter as defined in claim 12 further including a spring clip attaching said one component to the heat sink.

14. A power converter as defined in claim 1 wherein the comparator operates in a linear mode over at least part of the fan speed range.

15. A power converter as defined in claim 1 wherein the comparator includes a feedback circuit for operating the fan in a variable duty cycle mode over at least part of the fan speed range.

16. A power converter comprising an input;
 a switching circuit including two power transistors;
 a controller circuit for cycling the switching circuit in a variable duty cycle mode;
 a step-down transformer having a high voltage primary side connected to receive current pulses from the switching circuit amid a low voltage secondary side connected to a convertor output;
 a fan having an electric motor;
 a supply circuit connected between the primary side of the transformer and the fan motor;
 a first control circuit for operating the fan in a variable speed mode and including a grounded thermistor connected to one input of the control circuit; and
 a second control circuit; the thermistor being connected to an input of the second control circuit and wherein the output of the second control circuit is connected to the controller to stop cycling the switching circuit in response to an excessive temperature condition.

* * * * *

UNITED STATES PATENT AND TRADEMARK OFFICE
CERTIFICATE OF CORRECTION

| | | |
|---|---|---|
| PATENT NO. | : 7,782,002 B2 | Page 1 of 1 |
| APPLICATION NO. | : 11/221962 | |
| DATED | : August 24, 2010 | |
| INVENTOR(S) | : James C. Cook, II | |

It is certified that error appears in the above-identified patent and that said Letters Patent is hereby corrected as shown below:

In the Abstract, line 1, "PET" should be "FET";

In col. 25, line 19, "convertor" should be "converter";

In claim 8, col. 25, line 36, "ran" should be "fan";

In col. 26, line 8, "an" should be "amp".

Signed and Sealed this
Twenty-second Day of February, 2011

David J. Kappos
*Director of the United States Patent and Trademark Office*